United States Patent
Kurokawa

(10) Patent No.: US 8,130,610 B2
(45) Date of Patent: Mar. 6, 2012

(54) OPTICAL DISC RECORDING METHOD AND OPTICAL DISC RECORDER

(75) Inventor: Takahiro Kurokawa, Fujisawa (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/717,981

(22) Filed: Mar. 5, 2010

(65) Prior Publication Data

US 2011/0122756 A1    May 26, 2011

(30) Foreign Application Priority Data

Nov. 26, 2009 (JP) ................................ 2009-268994

(51) Int. Cl.
*G11B 20/10* (2006.01)

(52) U.S. Cl. ................ 369/47.5; 369/47.51; 369/59.11; 369/59.12; 369/116

(58) Field of Classification Search ................ 369/47.5, 369/47.51, 59.11, 59.12, 116
See application file for complete search history.

(56) References Cited

U.S. PATENT DOCUMENTS

| | | | | |
|---|---|---|---|---|
| 7,248,552 B2 * | 7/2007 | Furumiya et al. | ......... | 369/53.13 |
| 7,675,831 B2 * | 3/2010 | Minemura | ................ | 369/59.11 |
| 7,773,479 B1 * | 8/2010 | Sutardja et al. | ............ | 369/59.11 |
| 2006/0176795 A1 * | 8/2006 | Yu | ................................ | 369/59.1 |
| 2008/0094991 A1 | 4/2008 | Minemura | | |
| 2008/0273432 A1 * | 11/2008 | Oyama et al. | ............. | 369/47.53 |
| 2009/0092016 A1 * | 4/2009 | Kim et al. | .................. | 369/47.53 |
| 2009/0109814 A1 * | 4/2009 | Fujita et al. | .................. | 369/47.5 |
| 2010/0232270 A1 * | 9/2010 | Nakamura et al. | ......... | 369/47.15 |
| 2010/0290326 A1 * | 11/2010 | Ito et al. | .................... | 369/47.15 |

FOREIGN PATENT DOCUMENTS

| | | |
|---|---|---|
| EP | 0 957 475 | 11/1999 |
| JP | 2008-108300 | 5/2008 |

\* cited by examiner

*Primary Examiner* — Wayne Young
*Assistant Examiner* — Brenda Bernardi
(74) *Attorney, Agent, or Firm* — Antonelli, Terry, Stout & Kraus, LLP.

(57) ABSTRACT

To compensate for edge shifts varying largely in accordance with preceding mark lengths. Provided are a method and a recorder in which a duration of a cooling pulse in each recording pulse string to form a mark having a length of nT is determined on the basis of an edge shift amount of a front edge of a mark whose preceding mark has a length of nT, where n is an integer and T is a channel bit length.

21 Claims, 22 Drawing Sheets

RELATED ART

FIG. 4A

TSFP, FP

Certain mark length

|  | 2T | 3T | 4T | ≧5T |
|---|---|---|---|---|
| 2T |  |  |  |  |
| 3T |  |  |  |  |
| 4T |  |  |  |  |
| ≧5T |  |  |  |  |

Preceding space length

Unit : $T_W/16$

RELATED ART

FIG. 4B

TSLP, LP, CP

Certain mark length

|  | 2T | 3T | 4T | ≧5T |
|---|---|---|---|---|
| 2T |  |  |  |  |
| 3T |  |  |  |  |
| 4T |  |  |  |  |
| ≧5T |  |  |  |  |

Succeeding space length

Unit : $T_W/16$

RELATED ART

FIG. 5A

Front edge

RELATED ART

FIG. 5B

Back edge

FIG. 6

Front edge

Certain mark length

|  | | 2T | 3T | 4T | ≧5T |
|---|---|---|---|---|---|
| Preceding space length | 2T | +0.1 | −2.4 | +1.4 | +1.3 |
| | 3T | +0.7 | −0.3 | +0.5 | +1.3 |
| | 4T | −2.4 | −1.4 | −0.2 | +0.0 |
| | ≧5T | −2.5 | −1.5 | −0.5 | −0.3 |

Unit: %

FIG. 7A (Preceding mark length = 2T)

Certain mark length

| Preceding space length | 2T | 3T | 4T | ≧5T |
|---|---|---|---|---|
| 2T | +3.8 | −0.6 | +3.1 | +4.1 |
| 3T | +5.3 | +2.7 | +3.9 | +4.2 |
| 4T | −0.2 | +0.2 | +1.3 | +1.4 |
| ≧5T | −1.2 | −0.7 | +0.4 | +0.7 |

Unit: %

FIG. 7B (Preceding mark length = 3T)

Certain mark length

| Preceding space length | 2T | 3T | 4T | ≧5T |
|---|---|---|---|---|
| 2T | +4.0 | +0.5 | +3.5 | +4.1 |
| 3T | +0.6 | −0.7 | −0.0 | +0.7 |
| 4T | −1.9 | −0.8 | +0.2 | +0.6 |
| ≧5T | −2.9 | −1.0 | +0.1 | −0.4 |

Unit: %

FIG. 7C (Preceding mark length = 4T)

Certain mark length

|  | | 2T | 3T | 4T | ≧5T |
|---|---|---|---|---|---|
| Preceding space length | 2T | -3.1 | -5.1 | -1.4 | -1.6 |
| | 3T | -1.9 | -2.5 | -1.1 | -0.9 |
| | 4T | -3.5 | -2.3 | -0.9 | -1.0 |
| | ≧5T | -3.0 | -2.0 | -1.2 | -1.3 |

Unit: %

FIG. 7D (Preceding mark length ≧ 5T)

Certain mark length

|  | | 2T | 3T | 4T | ≧5T |
|---|---|---|---|---|---|
| Preceding space length | 2T | -7.7 | -8.4 | -4.5 | -4.7 |
| | 3T | -5.1 | -4.8 | -3.1 | -3.1 |
| | 4T | -5.2 | -4.1 | -2.8 | -2.1 |
| | ≧5T | -4.6 | -3.4 | -2.4 | -1.6 |

Unit: %

FIG. 9

Mark length

| Preceding space length | 2T | 3T | 4T | ≧5T |
|---|---|---|---|---|
| 2T | +0.5 | −2.2 | +1.0 | +1.6 |
| 3T | +1.0 | −0.2 | +0.3 | +1.1 |
| 4T | −2.3 | −1.6 | −0.4 | +0.2 |
| ≧5T | −2.6 | −1.6 | −0.8 | −0.3 |

Unit: %

FIG. 10A (Preceding mark length = 2T)

Certain mark length

| Preceding space length | 2T | 3T | 4T | ≧5T |
|---|---|---|---|---|
| 2T | +0.4 | −2.7 | +0.9 | +1.1 |
| 3T | +4.5 | +1.8 | +2.8 | +2.9 |
| 4T | −0.5 | −0.2 | +0.6 | +1.2 |
| ≧5T | −1.5 | −0.9 | −0.0 | +0.4 |

Unit: %

FIG. 10B (Preceding mark length = 3T)

Certain mark length

| Preceding space length | 2T | 3T | 4T | ≧5T |
|---|---|---|---|---|
| 2T | +2.3 | −0.5 | +2.3 | +2.8 |
| 3T | −0.3 | −1.2 | −0.9 | −0.5 |
| 4T | −1.6 | −1.1 | −0.1 | +0.4 |
| ≧5T | −3.1 | −1.4 | −0.3 | −0.6 |

Unit: %

FIG. 10C (Preceding mark length = 4T)

Certain mark length

|  | | 2T | 3T | 4T | ≧5T |
|---|---|---|---|---|---|
| Preceding space length | 2T | −0.4 | −2.9 | −0.5 | +1.0 |
| | 3T | −1.0 | −1.6 | −0.9 | +0.4 |
| | 4T | −3.4 | −2.1 | −0.9 | −0.6 |
| | ≧5T | −2.7 | −1.7 | −1.3 | −1.3 |

Unit: %

FIG. 10D (Preceding mark length ≧ 5T)

Certain mark length

|  | | 2T | 3T | 4T | ≧5T |
|---|---|---|---|---|---|
| Preceding space length | 2T | −0.8 | −2.5 | 0.7 | 1.6 |
| | 3T | −2.5 | −2.7 | −1.7 | −0.6 |
| | 4T | −4.5 | −3.8 | −1.8 | −1.3 |
| | ≧5T | −3.9 | −3.1 | −2.3 | −0.8 |

Unit: % a : Preceding mark length = aT
b : Preceding mark length = bT
c : Preceding mark length = cT
d : Preceding mark length = dT

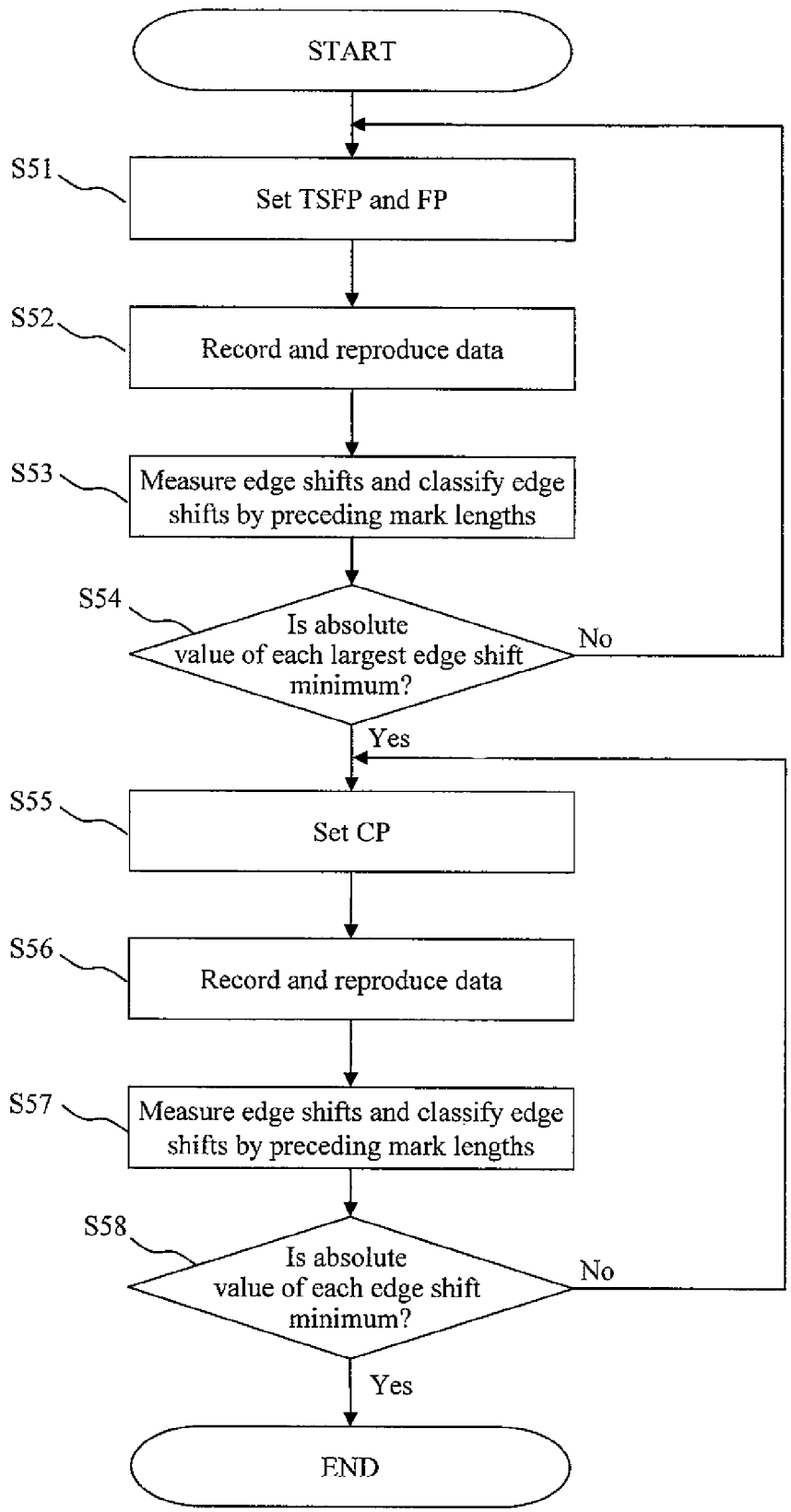

OPTICAL DISC RECORDING METHOD AND OPTICAL DISC RECORDER

CLAIM OF PRIORITY

The present application claims priority from Japanese patent application JP 2009-268994 filed on Nov. 26, 2009, the content of which is hereby incorporated by reference into this application.

BACKGROUND OF THE INVENTION

1. Field of Invention

The present invention relates to: an optical disc recording method in which information is recorded on an optical disc by irradiating the optical disc with an intensity-modulated pulsed laser beam; and an optical disc recorder using the method.

2. Related Art

In recording information on a recordable optical disc, the optical disc is irradiated with an intensity-modulated pulsed laser beam. In this way, the state of a recording film is changed, so that marks and portions (spaces) between the marks are formed. Among recordable optical discs, DVD-Rs and DVD+Rs are well known as write-once read-many (WORM) optical discs on which information can be recorded only once, while DVD-RAMs, DVD-RWs and DVD+RWs are well known as rewritable optical discs on which information can be overwritten. Additionally, in recent years, Blu-ray Discs (BDs), which are large-capacity optical discs using a blue light source, are put into actual use, and are provided as WORM BD-Rs and rewritable BD-REs.

In a mark-edge recording method employed for currently-available optical discs, code information of a mark is specified by front and back edge positions of the mark. Accordingly, in recording information in the method, it is necessary to perform control for appropriately positioning each mark edge by adjusting the power of a laser beam and pulse timing. Edge positions of each recorded mark need to be controlled by taking account of an influence of heat generated in recorded marks before and after the recorded mark as well. For this reason, such control employs an adaptive recording control in which the edge positions of each mark are controlled by classifying starting times of starting edges of pulses and durations of the pulses on the basis of combination patterns of the length of the mark and lengths of spaces adjacent to the mark.

FIG. 1 is a chart showing recording pulse waveforms in an "N−1 write strategy," which is a recording method used for BDs and the like. This term "N−1 write strategy" is named after the fact that a mark having a length of NT is recorded by using a pulse string including (N−1) pulses in this recording method. FIG. 1 shows pulse strings for recorded marks having lengths of 2T to 5T (where T indicates a channel bit length) among marks having lengths of 2T to 9T used in BD coding. The initial pulse of a pulse string is called a first pulse, and the last pulse of the pulse string is called a last pulse. Multiple pulses between the first pulse and the last pulse are called multipulses, and the number of the multipulses increases by one as the mark length increases by 1T. It should be noted, however, that the pulse string for a mark having a length of 2T only includes a first pulse, and the pulse string for a mark having a length of 3T includes a first pulse and a last pulse, without including any multipulse. A pulse immediately after the last pulse is called a cooling pulse.

A laser beam can be outputted at output power levels of a write power $P_W$, a space power (erase power) $P_S$, a bias power $P_{BW}$ and a cooling power $P_C$. The write power $P_W$ is a power level used for a first pulse, each multipulse and a last pulse, and causes a state change of a recording film by supplying an energy to the recording film. The space power $P_S$ is a power level used for irradiating a portion (space) to be positioned between marks. The space power $P_S$ is used for preheating for forming a succeeding mark in the case of a WORM disc, and is used for direct rewriting in which a mark is erased and is thereby replaced with a space, in the case of a rewritable disc using a phase-change recording film. The cooling power $P_C$ is a power level used for a cooling pulse. The cooling power $P_C$ is used to reduce thermal interference by stopping thermal diffusion to a portion in which a succeeding mark is to be recorded, in the case of a WORM disc, and is used to form an amorphous mark by rapid cooling of a recording film after heating, in the case of a rewritable disc. It should be noted that each type of the power levels has the same value irrespective of the mark length.

Parameters related to pulse timing include first-pulse starting-edge time TSFP, a first pulse duration FP, a multipulse duration MP, a last-pulse starting-edge time TSLP, a last pulse duration LP and a cooling pulse duration CP. Here, each of TSFP and TSLP is defined on the basis of an NRZI channel bit signal of recording data, as shown in FIG. 1. Among these pulse parameters, TSFP, FP, TSLP, LP and CP are used to control edge positions of each mark. The value of each of the parameters is set for each combination pattern of the length of a certain mark and the length of a space immediately before the certain mark and for each combination pattern of the length of the certain mark and a space immediately after the certain mark. In the following in this description, a "certain mark" indicates a mark to be subjected to recording pulse control or a mark to be subjected to edge shift detection, a "preceding space" indicates a space immediately before the certain mark, a "succeeding space" indicates a space immediately after the certain mark, and a preceding mark indicates a mark preceding the certain mark.

As a method for adjusting each pulse parameter to an optimal value, known are a method of minimizing pulse jitter and a method of minimizing edge shift. FIG. 2 schematically shows: marks and spaces recorded on a medium; the waveform of an equalized reproduction signal corresponding to the marks and spaces; the waveform of a binarized reproduction signal obtained by binarizing the equalized reproduction signal; and the waveform of a channel bit clock signal generated from the binarized generation signal. Jitter is obtained by normalizing, at a channel clock cycle, a standard deviation of time differences between the binarized reproduction signal and the channel bit clock signal at mark edges. Edge shift is obtained by normalizing, at the channel clock cycle, an average value of time differences between the binarized reproduction signal and the channel bit clock signal at the edges. As to edge shift, the plus symbol indicates a direction in which a light spot moves relative to the optical disc while the minus symbol indicates a direction opposite to the direction indicated by the plus symbol.

FIG. 3 is a flowchart showing an example of a conventional pulse parameter adjustment procedure. In this adjustment procedure, the following write strategy is employed to detect edge shifts. In the write strategy, the parameters TSFP and FP related to front-edge control are classified on the basis of patterns of 4×4 combinations of mark lengths (2T, 3T, 4T and 5T or larger) and preceding space lengths (2T, 3T, 4T and 5T or larger) while the parameters TSLP, LP and CP related to back-edge control are classified on the basis of patterns of 4×4 combinations of mark lengths (2T, 3T, 4T and 5T or larger) and succeeding space lengths (2T, 3T, 4T and 5T or larger).

Then, by using the write strategy, edge shifts for front edges are classified and detected on the basis of the combination patterns of the mark lengths and the preceding space lengths; edge shifts for back edges are classified and detected on the basis of the combination patterns of the mark lengths and the succeeding space lengths. Thereby, each of the pulse parameters is adjusted so that the edge shift would be a minimum in each of the patterns.

When the processing is started, values are set for each of the pulse parameters TSFP, FP, MP, TSLP, LP and CP in Step 11. For each of the pulse parameters, predetermined initial values are set in a first loop, and currently-set values are changed in a second or subsequent loop. Here, for each of TSFP and FP related to the front-edge control, values are classified and set on the basis of the combination patterns of the mark lengths and the preceding space lengths; for each of TSLP, LP and CP related to the back-edge control, values are classified and set on the basis of the combination patterns of the mark lengths and the succeeding space lengths. It should be noted that the same value is used for MP for all patterns.

FIGS. 4A and 4B show tables of parameter setting values. FIG. 4A is a table for each of TSFP and FP, while FIG. 4B is a table for each of TSLP, LP and CP. Thus, a total of five tables are used. In FIGS. 4A and 4B, $T_W$ denotes a channel bit clock cycle.

In Step 12, random data is recorded on a predetermined portion of an optical disc medium, and the recorded data is reproduced. In Step 13, edge shifts are calculated by using a reproduction signal. Specifically, for front edges, edge shifts are classified and calculated on the basis of the combination patterns of the mark lengths and the preceding space lengths; for back edges, edge shifts are classified and calculated on the basis of the combination patterns of the mark lengths and the succeeding space lengths. FIGS. 5A and 5B each show a table of edge shift values classified on the basis of the patterns. FIG. 5A shows a table obtained by classifying and calculating edge shifts on the basis of the combination patterns of the mark lengths and the preceding space lengths, while FIG. 5B shows a table obtained by classifying and calculating edge shifts on the basis of the combination patterns of the mark lengths and the succeeding space lengths. In Step 14, it is determined whether or not the absolute value of the edge shift obtained on the basis of each of all the patterns is the minimum. If Yes, the processing is terminated. If No, the processing returns to Step 11, and the values of each of the pulse parameters are changed. In this way, the pulse parameters are determined so that the absolute value of the edge shift obtained on the basis of each of all the patterns would be the minimum.

Patent Document 1: JP 2008-108300 A

SUMMARY OF THE INVENTION

FIG. 6 is a 4×4 table showing edge shifts of mark front edges. Specifically, random data is recorded on a one-layer BD-R disc at a recording density of 25 GB/layer in accordance with a BD format and is then reproduced. Each of the edge shifts of mark front edges is classified and measured on the basis of combinations of mark lengths (2T, 3T, 4T and $\geq$5) and preceding space lengths (2T, 3T, 4T and $\geq$5). The edge shifts thus measured are shown in the table. Here, data transfer rate is set at twice as fast as the standard transfer rate for a BD in recording and reproduction. The N−1 write strategy is employed as a recording method, and the value of each of pulse parameters is set to be the same for each of all the mark lengths as follows:

FP=MP=LP=8
CP=16
TSFP=TSLP=0 (unit: $T_W/16$)

Here, the channel bit clock cycle $T_W$ is $T_W$=7.58 ns under the condition in which the data transfer rate is twice as fast as of the standard transfer rate for a BD. A standard reproduction circuit for a BD is used for reproduction signal processing in edge shift measurement.

From the results shown in FIG. 6, the edge shift values are within ±3%, which is an ignorable range, in all the patterns. In addition, the value of total jitter in this case is 4.7%.

However, a further detailed analysis of the results reveals the following problem. FIGS. 7A to 7D each show a 4×4 table shown in FIG. 6 which is further classified by a preceding mark length (2T, 3T, 4T or $\geq$5T). FIG. 7A shows edge shifts when the preceding mark length is 2T, FIG. 7B shows edge shifts when the preceding mark length is 3T, FIG. 7C shows edge shifts when the preceding mark length is 4T, and FIG. 7D shows edge shifts when the preceding mark length is 5T or larger. For example, as to a pattern corresponding to a mark length of 2T and a preceding space length of 2T (in a cell indicated by a solid frame), the edge shift is +0.1%, which is approximately 0, in the result shown in FIG. 6. However, in the results shown in FIGS. 7A to 7D, the edge shifts are increased in a plus direction, i.e., +3.8% and +4.0%, when the preceding mark length is 2T (FIG. 7A) and 3T (FIG. 7B), respectively, while being increased in a minus direction, i.e., −3.1% and −7.7%, when the preceding mark length is 4T (FIG. 7C) and 5T or larger (FIG. 7D), respectively. Thus, the absolute values of the edge shifts in the results shown in FIGS. 7A to 7D are too large to ignore. Such tendency is commonly found in patterns other than the above, and is especially prominent in the patterns in which the preceding space length is 2T.

As described above, even if the absolute value of an edge shift classified on the basis of the combination patterns of the mark lengths and the preceding space lengths is approximately 0, the absolute value of the edge shift, if further classified using the preceding mark length, sometimes increase to values which are too large to ignore. This is considered to be because the distributions of edge shifts by the preceding mark lengths are as shown in FIG. 8A. FIG. 8A is a graph schematically showing the results shown in FIG. 6 and FIGS. 7A to 7D, and specifically is a distribution graph showing edge shift amount and the number of measured edges in the horizontal axis and the vertical axis, respectively, on the basis of the pattern of a mark length of 2T and a preceding space length of 2T. The distributions a, b, c and d are respectively those obtained when the preceding mark length is 2T, 3T, 4T and 5T or larger. The distribution indicated as total is a total distribution of the edge shifts in all the patterns corresponding to a mark length of 2T and a preceding space length of 2T. In other words, in FIG. 8A, the average value of the total distribution corresponds to the value in the cell indicated by the solid frame, while the average values of the distributions a, b, c and d correspond respectively to the values in the cells indicated by solid frames in FIGS. 7A to 7D. In FIG. 8A, although the distributions corresponding to preceding mark lengths of 2T and 3T are toward the plus side while the distributions corresponding to preceding mark lengths of 4T and 5T or larger are toward the minus side, the average value of the total distribution based on all the four kinds of patterns is approximately 0.

If the distributions of the edge shifts classified by the preceding mark lengths vary largely as in the above-described case, the standard deviation of the distributions is large and consequently the total jitter is large, even when the average value of the total distribution is approximately zero. This reduces a system margin of a drive, which consequently increases reproduction errors. A reduction in system margin reduces the possibility of further improvements in recording and reproduction rate and recording density in the future. For this reason, it is desirable that the distributions of the edge shifts classified by the preceding mark lengths be each compensated to be close to zero as shown in FIG. 8B.

To solve the above-described problem that edge shifts vary in accordance with the preceding mark lengths, Patent Literature 1 provides the following technique. In the technique, the start position and the end position of a laser pulse are compensated on the basis of the length of a recorded mark, the length of a preceding space, the length of a preceding mark and the length of a succeeding space. However, recording pulse parameters need to be classified by at least preceding mark lengths in addition to mark lengths and preceding space lengths. This cannot be implemented by using a general laser pulse controller using recording pulse parameter tables classified on the basis of combinations of the mark lengths and the preceding space lengths. Hence, a complicated recording system is required.

An object of the present invention is to provide: an optical disc recording method which allows compensation of edge shifts varying in accordance with preceding mark lengths, by using a recording pulse parameter classified at least on the basis of combination patterns of mark lengths and preceding space lengths; and an optical disc recorder using the method.

An optical disc recording method of the present invention is a method for recording information on an optical disc medium by irradiating the optical disc medium with a laser beam to form marks and portions between the marks (spaces), the laser beam being intensity-modulated to have pulse strings each including a cooling pulse. The recording method employs the following means to achieve the above-described object.

(1) The recording method includes the steps of: detecting an edge shift amount of a front edge of each of recorded marks whose preceding mark is a mark having a length of nT, where n is an integer and T is a channel bit length; and determining a duration of the cooling pulse in the pulse string forming the mark having a length of nT, on the basis of the detected edge shift amount.

Thereby, edge shifts of front edges of marks, the edge shifts varying in accordance with preceding mark lengths, can be compensated.

Here, the reason for using a cooling pulse to compensate the edge shift of the front edge of each mark is because the amount of heat leaking into a position forming a mark succeeding a certain mark can be changed by changing the duration of the cooling pulse of the certain mark. For example, when the duration of the cooling pulse is increased, the amount of heat leaking into the position forming the mark succeeding the certain mark decreases, and consequently the front edge of the succeeding mark moves in such a direction that the length of the succeeding mark would be smaller, in other words, the edge shift changes in a plus direction. When the duration of the cooling pulse is decreased, on the other hand, the edge shift changes in a minus direction.

Another reason for using a cooling pulse is because the edge shift of the front edge of a mark can be controlled by using a pulse parameter classified at least in accordance with mark lengths. This contributes not only to formation of the back edge of a certain mark but also to formation of the front edge of the succeeding mark. To solve the problem by using a parameter contributing only to formation of a certain mark, a parameter needs to be classified and controlled at least by preceding mark lengths as in the method of Patent Literature 1. This increases the number of parameters and consequently makes the recording system complicated.

In addition, the reason for using edge shifts as indices for determining the duration of each cooling pulse is because variations in distribution of the edge shifts can be apparent in this way. In other words, this indicates whether to increase or decrease the duration of the cooling pulse, and also the amount by which the duration should be increased or decreased. This contributes to saving adjustment time.

(2) A recorded mark whose preceding mark has a length of nT and for which an edge shift amount of the front edge is to be detected is the recorded mark whose immediately preceding space has a minimum length in accordance with a code rule.

In this method, in particular, the duration of a cooling pulse is adjusted by using, as an index, the edge shift of a pattern whose preceding space length is the minimum in accordance with the code rule, by the means shown in (1). The minimum space length for BDs is 2T, for example.

The adjustment is performed as described above because, when the preceding space length is the minimum, the amount of thermal interference between the marks is the largest. In such a case, edge shifts varying in accordance with preceding mark lengths can be detected at a high detectivity.

(3) A recorded mark whose preceding mark has a length of nT and for which an edge shift amount of the front edge is to be detected is the recorded mark having a minimum length in accordance with a code rule.

In this method, in particular, the duration of a cooling pulse is adjusted by using, as an index, the edge shift of a pattern having a minimum length in accordance with the code rule, by the means shown in (1). The minimum mark length for BDs is 2T, for example.

This is because, when the mark length is the minimum, an influence of thermal interference between the marks is the largest, and consequently variations in edge shift are large. In such a case, as in the method described in (2), edge shifts varying in accordance with preceding mark lengths can be detected at a high detectivity.

(4) A recorded mark whose preceding mark has a length of nT and for which an edge shift amount of the front edge is to be detected is the recorded mark having a minimum length in accordance with a code rule and having an immediately preceding space having a minimum length in accordance with the code rule.

This method is a combination of the methods described in (2) and (3). It is expected that, with this method, edge shifts varying in accordance with preceding mark lengths be detected at a higher detectivity.

(5) The duration of the cooling pulse in the pulse string forming the mark having a length of nT is determined so that the absolute value of the edge shift amount would be approximately the minimum.

With this method, edge shifts varying in accordance with preceding mark lengths can be compensated by using any one of the methods described in (1) to (4). Such adjustment can compensate edge shifts and reduce total jitter.

(6) The duration of the cooling pulse in the pulse string forming the mark having a length of nT is determined so that the edge shift amounts would be approximately the same.

Different from the method described in (5), this method is intended for a case in which the absolute value of each edge shift cannot be set to be the minimum directly. Specifically, the edge shift values classified by preceding mark lengths are set to be approximately the same value temporarily. All the edge shifts can be changed at once by controlling a start time of a pulse string corresponding to a certain mark, for example.

(7) A duration and any one of a start time and an end time of each pulse in each of the pulse strings are classified and controlled at least on the basis of the mark lengths.

Compensation of edge shifts varying in accordance with preceding mark lengths, according to the present invention, can be made by classifying and controlling the duration of each cooling pulse at least by the mark lengths. This method can achieve the object of the present invention by using a minimum number of recording pulse parameters, and hence contributes to simplification of a laser pulse controlling circuit.

(8) A duration and any one of a start time and an end time of each pulse in each of the pulse strings are classified and controlled at least on the basis of combinations of lengths of the marks and lengths of the spaces each immediately preceding a corresponding one of the marks.

The technique disclosed in Patent Literature 1 requires the use of pulse parameters classified at least on the basis of combinations of mark lengths, preceding space lengths and preceding mark lengths, in order to compensate edge shifts varying in accordance with the preceding mark lengths. Thus, this technique has a problem of making the laser pulse controlling circuit complicated. However, with the configuration in (8), the duration of the cooling pulse only needs to be classified and controlled at least by the mark lengths. Hence, such problem can be solved.

(9) The recording method includes the steps of: determining a start time of each of the pulse strings classified on the basis of combinations of lengths of the marks and lengths of the spaces each immediately succeeding a corresponding one of the marks, so that the absolute value of the edge shift amount of the front edge of each of the marks classified on the basis of the combinations of the lengths of the marks and the lengths of the spaces each immediately preceding the corresponding mark would be approximately the minimum; and subsequently determining the duration of the cooling pulse in each of the pulse strings each forming a mark having a length of nT, so that the absolute value of the edge shift amount would be approximately the minimum.

This method is an effective means when the edge shift values classified by preceding mark lengths vary too much from 0 to compensate the edge shifts only by adjustment of the duration of each cooling pulse. The average values of the distributions of the edge shifts classified by the preceding mark lengths are compensated to be close to 0 as a group, and thereby each of the distributions of the edge shifts are compensated to be close to 0.

(10) The recording method including the steps of: determining the duration of the cooling pulse in the pulse string forming the mark having a length of nT, so that the absolute value of the edge shift amount would be approximately the minimum; and subsequently determining a start time of each of the pulse strings classified on the basis of combinations of lengths of the marks and lengths of the spaces each immediately succeeding a corresponding one of the marks, so that an absolute value of the edge shift amount of the front edge of each of the marks classified on the basis of the combinations of the lengths of the marks and the lengths of the spaces each immediately preceding the corresponding mark would be approximately the minimum.

As the method described in (9), this method is also an effective means when the edge shift values classified by the preceding mark lengths vary too much from 0 to compensate only by adjustment of the duration of each cooling pulse. A difference from the method in (9) is that the distributions of the edge shifts varying in accordance with preceding mark lengths are compensated to be the same, and then the average value of the distributions as a group is set to be close to 0.

(11) The optical disc medium is a write-once read-many optical disc. The technique according to the present invention is especially effective when a write-once read-many optical disc is used as a medium. This is because, in the case of a write-once read-many optical disc, the position of the back edge of a certain mark is determined by the end of a last pulse with almost no influence of a cooling pulse. Accordingly, the duration of the cooling pulse duration can be determined only by controlling thermal interference in the succeeding mark. In the case of a rewritable optical disc using a phase-change recording film, on the other hand, the position of the back edge of a mark strongly depends on the duration of a cooling pulse. For this reason, the duration of the cooling pulse cannot be determined only by adjustment of thermal interference in the succeeding mark in some cases.

(12) The recording method includes the steps of: classifying and detecting edge shift amounts of the front edges of the marks by lengths of the marks each preceding a corresponding one of the marks; determining a start time of each of the pulse strings classified on the basis of combinations of lengths of the marks and lengths of the spaces each immediately succeeding a corresponding one of the marks, so that the absolute value of a smallest one of the edge shift amounts thus classified and detected would be the minimum; and subsequently determining the duration of the cooling pulse in each of the pulse strings each forming a mark having a length of nT, so that the absolute value of the edge shift amount would be approximately the minimum.

This method is approximately the same as the method descried in (9). In this method, however, the average value of the distribution having the smallest edge shift values is set to be close to 0, instead of setting the average values of the distributions of the edge shifts classified by the preceding mark lengths to be close to 0 all together. Thereafter, the distribution having the smallest edge shifts is left as it is, and the average value of each of the other distributions is set to be close to 0.

(13) The recording method includes the steps of: classifying and detecting edge shift amounts of the front edges of the marks by lengths of the marks each preceding a corresponding one of the marks; determining a start time of each of the pulse strings classified on the basis of combinations of lengths of the marks and lengths of the spaces each immediately succeeding a corresponding one of the marks, so that the absolute value of a largest one of the edge shift amounts thus classified and detected would be the minimum; and subsequently determining the duration of the cooling pulse in each of the pulse strings each forming a mark having a length of nT, so that the absolute value of the edge shift amount would be approximately the minimum.

This method is approximately the same as the method descried in (12). In this method, however, the average value of the distribution having the largest edge shift values is set to be close to 0. Thereafter, the distribution having the largest edge shifts is left as it is, and the average value of each of the other distributions is set to be close to 0.

An optical disc drive of the present invention includes the following means.

(14) The optical disc drive includes: an optical disc medium on which information is recorded; a laser beam generating means for recording information on the optical disc medium by irradiating the optical disc medium with a laser beam to form marks and portions between the marks (spaces), the laser beam being intensity-modulated to have pulse strings each including a cooling pulse; a laser beam controlling means for controlling a power level, a duration and any one of a start time and an end time of each pulse in the pulse strings; and an edge shift detecting means for detecting an edge shift amount of each of the marks thus formed. In the optical disc drive, the edge shift detecting means classifies and calculates an edge shift amount of a front edge of each of the marks whose preceding mark is a mark having a length of nT by lengths of the marks each preceding any one of the marks, where n is an integer and T is a channel bit length, and the laser beam controlling means determines the duration of the cooling pulse in the pulse string forming the mark having a length of nT, on the basis of the detected edge shift amount.

With this optical disc drive, an optical disc drive including the recording pulse adjusting means according to any one of (1) to (13) can be obtained.

The effects of the present invention will be shown with reference to results of an experiment.

The duration of a cooling pulse in a pulse string corresponding to a preceding mark length of 2T is adjusted so that the absolute value of an edge shift in the cell indicated by a solid frame in FIG. 7A would be the minimum. Similarly, the duration of a cooling pulse in a pulse string corresponding to each of preceding mark lengths of 3T, 4T and $\geq$5T (a pulse string for a mark corresponding to a preceding mark of a certain mark) is adjusted so that the absolute value of an edge shift in the cell indicated by a solid frame in a corresponding one of FIGS. 7B to 7D would be the minimum.

As a result of this adjustment, the cooling pulse durations CP(2T) and CP(3T) of the marks respectively having mark lengths of 2T and 3T are decreased, while the cooling pulse durations CP(4T) and CP(5T$\geq$) of the marks respectively having mark lengths of 4T and 5T or larger are increased, as shown below.

CP(2T)=11
CP(3T)=13
CP(4T)=20
CP($\geq$5)=29 (unit: $T_W$/16)

FIG. 9 is a 4×4 table showing edge shifts of mark front edge classified on the basis of combination patterns of mark lengths and preceding space lengths after the above-described cooling pulse duration adjustment. FIGS. 10A to 10D are 4×4 tables showing edge shifts of mark front edge further classified by preceding mark lengths (2T, 3T, 4T and $\geq$5T). When the cooling pulse duration is set at the same value for all the mark lengths, the front edge shift amounts of the marks respectively having preceding mark lengths of 2T, 3T, 4T and $\geq$5T are +3.8%, +4.0%, −3.1% and −7.7%, respectively. After the cooling pulse duration adjustment, the front edge shift amounts are +0.4%, +2.3%, −0.4% and −0.8%, respectively, which are within an ignorable range in absolute value.

Moreover, the total jitter value is 4.7% in the case of not applying the present invention, while being improved to 4.2% by adjusting the cooling pulse duration for each mark length with an application of the present invention. This improvement in total jitter value is obviously because the distributions of the edge shift amounts classified by the preceding mark lengths are each compensated from the state shown in FIG. 8A to an ideal state shown in FIG. 8B. An improvement in total jitter value increases a margin for various disturbances during operation of the drive, and thereby contributes to an increase in recording and reproduction rate and an increase in record density. The effects of the present invention are demonstrated by the above-described results.

BRIEF DESCRIPTION OF THE DRAWINGS

FIG. 4A shows a setting table for each of TSFP and FP.
FIG. 4B shows a setting table for each of TSLP, LP and CP.
FIG. 5A shows an edge shift detection table for front edge.
FIG. 5B shows an edge shift detection table for back edge.
FIG. 6 shows a table obtained by further classifying a 4×4 table by a preceding mark length, the 4×4 table showing edge shifts of mark front edge classified on the basis of combination patterns of mark lengths and preceding space lengths.

FIG. 7A is a table schematically showing a distribution of edge shifts when the preceding mark length is 2T.
FIG. 7B is a table schematically showing a distribution of edge shifts when the preceding mark length is 3T.
FIG. 7C is a table schematically showing a distribution of edge shifts when the preceding mark length is 4T.
FIG. 7D is a table schematically showing a distribution of edge shifts when the preceding mark length is 5T or larger.

Figures 5A, 5B:
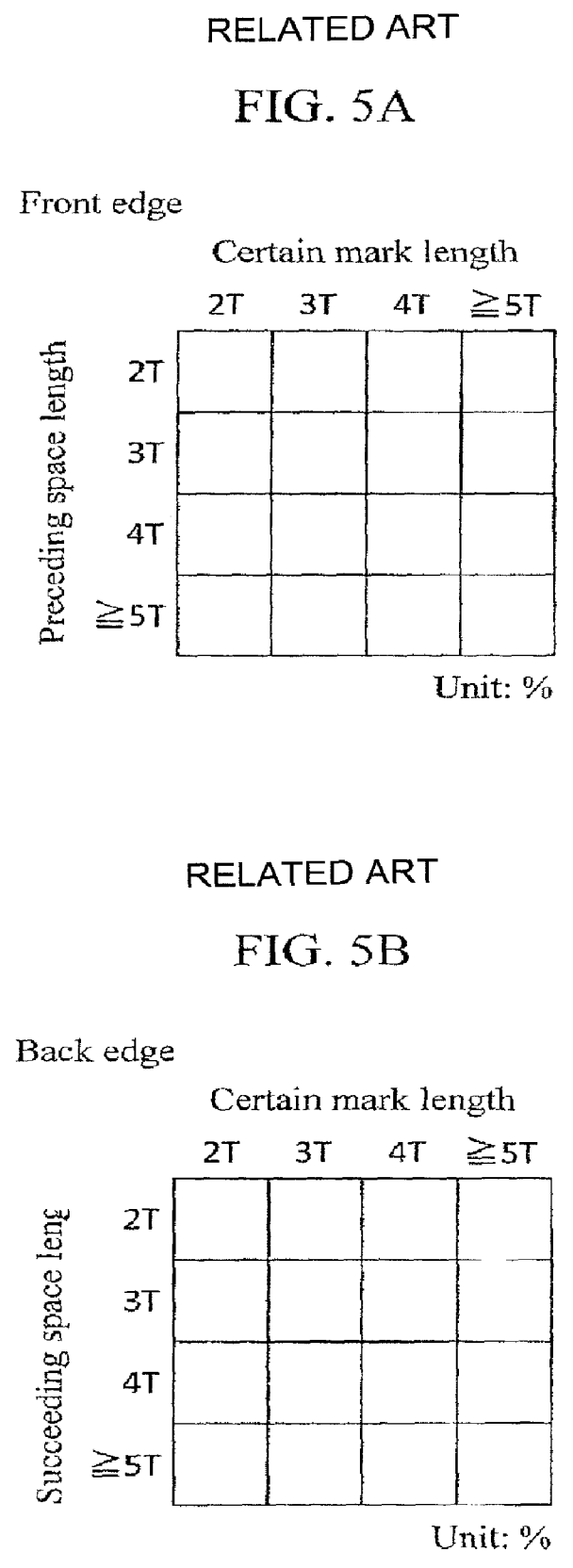

FIG. 5B is a graph showing distributions of edge shifts classified by the preceding mark lengths.

FIG. 9 is a 4×4 table showing edge shifts of mark front edge classified on the basis of combination patterns of mark lengths and preceding space lengths.

FIG. 10A is a 4×4 table showing edge shifts of mark front edge classified on the basis of combinations of mark lengths and preceding space lengths when a preceding mark length is 2T.

FIG. 10B is a 4×4 table showing edge shifts of mark front edge classified on the basis of combinations of mark lengths and preceding space lengths when the preceding mark length is 3T.

FIG. 10C is a 4×4 table showing edge shifts of mark front edge classified on the basis of combinations of mark lengths and preceding space lengths when the preceding mark length is 4T.

FIG. 10D is a 4×4 table showing edge shifts of mark front edge classified on the basis of combinations of mark lengths and preceding space lengths when the preceding mark length is 5T or larger.

FIG. 18 is a flowchart showing an example of the cooling pulse duration adjustment procedure.

DESCRIPTION OF THE PREFERRED EMBODIMENTS

Embodiments according to the present invention will be described below with reference to the drawings.

Embodiment 1

Figure 11:
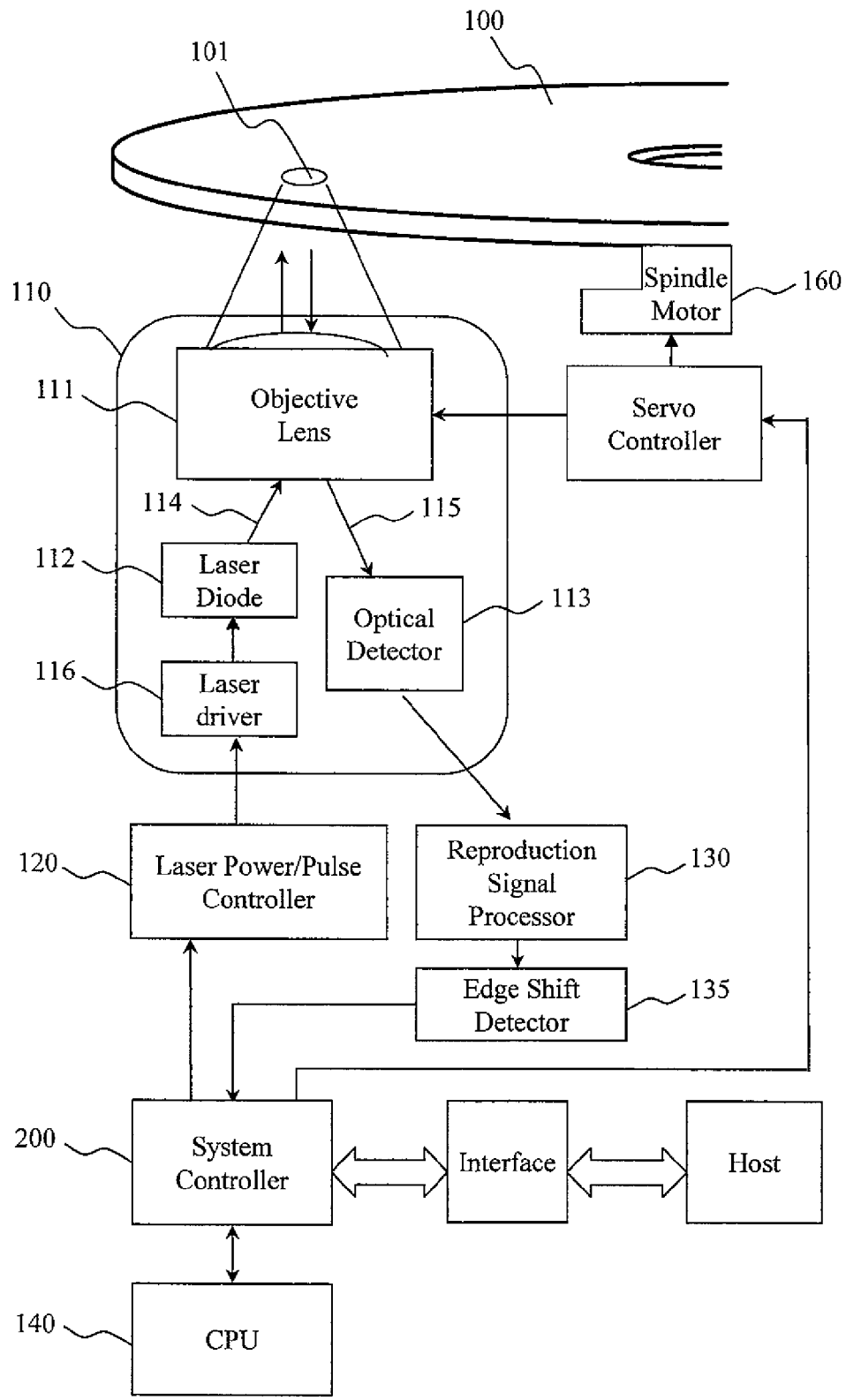
FIG. 11 is a diagram showing a configuration example of an optical disc drive.

Description will be given of a configuration example of an optical disc drive which is preferable for implementing the present invention. Here, the configuration example is based on a BD system. FIG. 11 is a schematic diagram showing a configuration example of an optical disc drive to which the present invention is applied. An optical disc medium 100 mounted on the drive is rotated by a spindle motor 160. In reproduction, a laser-power/pulse controller 120 controls a current to be supplied to a laser diode 112 via a laser driver 116 in an optical head 110, so as to obtain a light intensity instructed by a CPU 140, and the laser diode 112 generates a laser beam 114 accordingly. The laser beam 114 is concentrated by an objective lens 111, and thereby forms an optical spot 101 on the optical disc medium 100. A reflected laser beam 115 from the optical spot 101 is detected by an optical detector 113 via the objective lens 111. The optical detector 113 includes a light detecting element which is divided into multiple portions. A reproduction signal pre-processor 130 reproduces information recorded on the optical disc medium 100, by using a signal detected by the optical head 110. The entire drive is controlled by a system controller 200.

The reproduction signal processor 130 generates a channel bit clock signal by performing processing such as band-limiting filter, auto-slicer or phase locked loop (PLL), and generates a binarized reproduction signal. By using the channel bit clock signal and the binarized reproduction signal generated by the reproduction signal processor 130, an edge shift detector 135 measures an edge shift and thereby acquires, as the edge shift, a value obtained by normalizing, at a channel bit clock cycle, a time difference between the binarized reproduction signal and the channel bit clock signal at each reproduction signal edge. Moreover, the edge shift detector 135 classifies edge shift values at the measurement edges into combination patterns of mark lengths, preceding space lengths and preceding mark lengths on the basis of a data pattern of the binarized reproduction signal, and calculates and outputs the average value of the edge shifts on the basis of the patterns.

Figure 1:
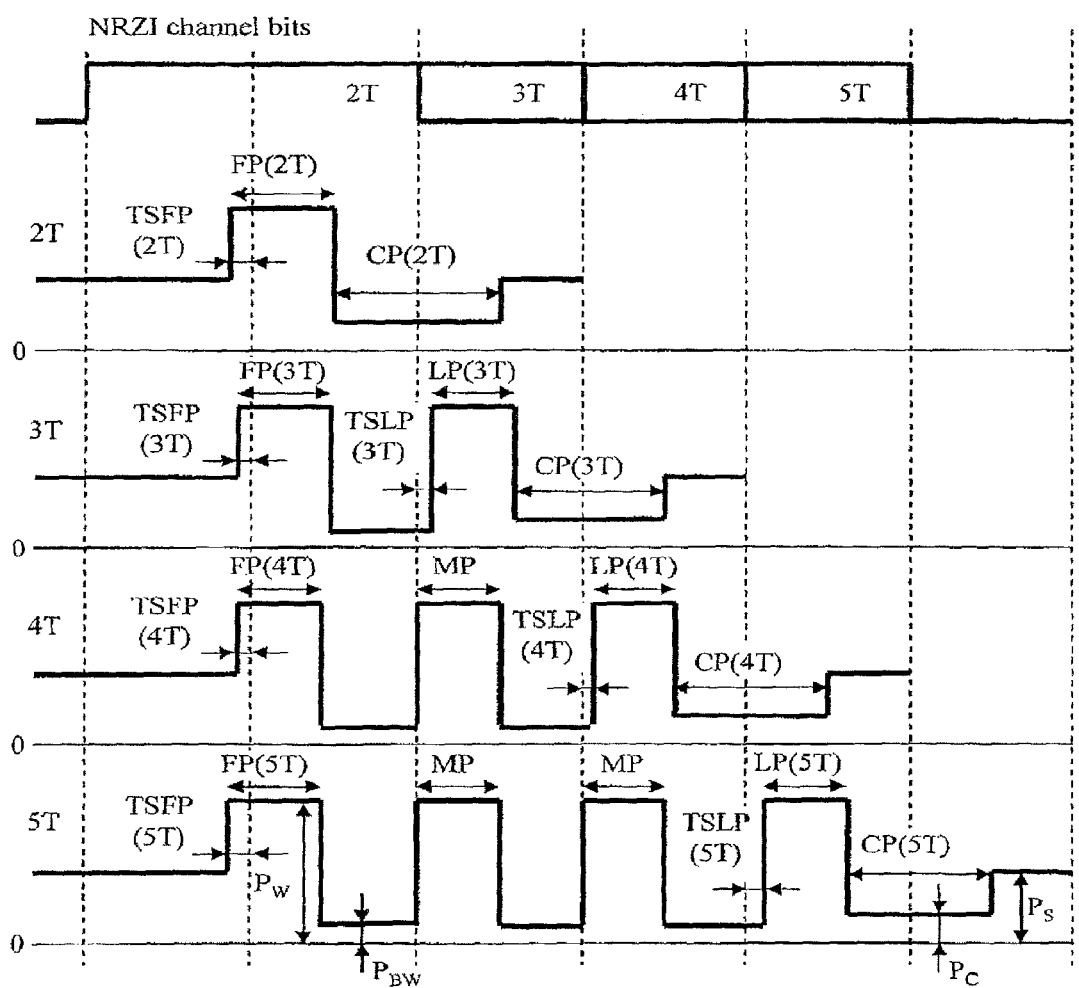
FIG. 1 is a chart showing recording pulse waveforms of an NH write strategy.
Figure 2:
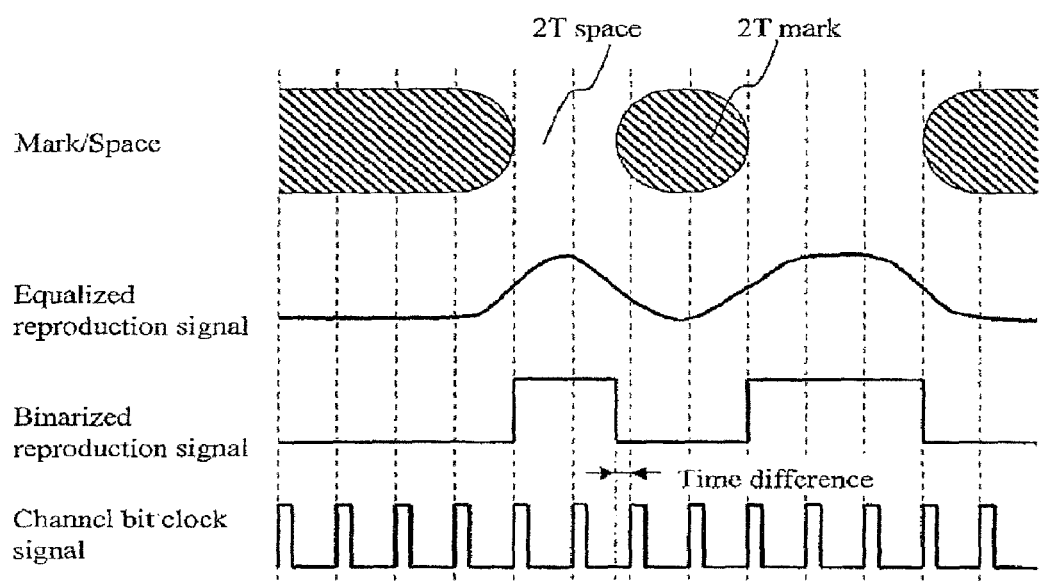
FIG. 2 is a view schematically showing marks/spaces recorded on a medium, and the waveforms of an equalized reproduction signal, a binarized reproduction signal and a channel bit clock signal.
Figure 3:
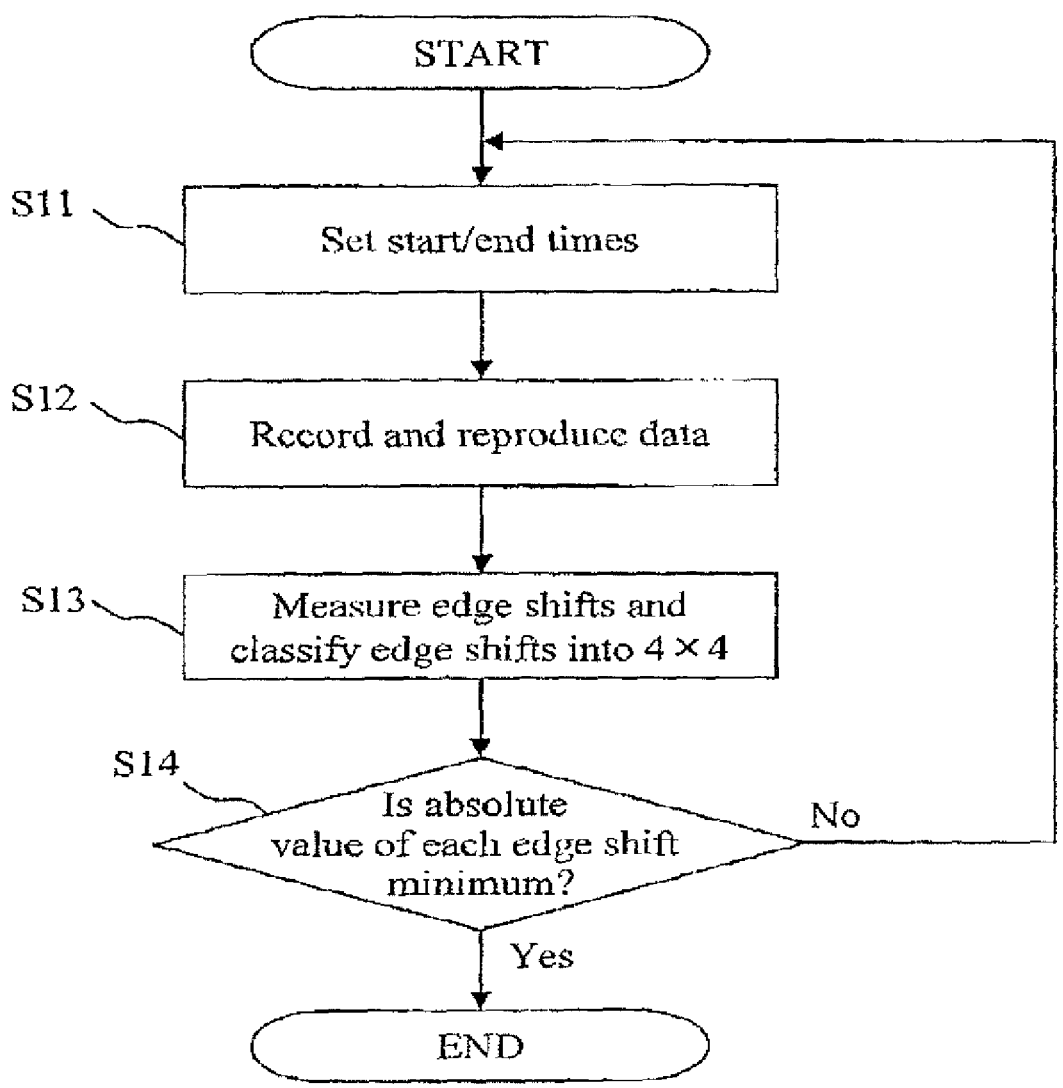
FIG. 3 is a flowchart showing an example of a conventional pulse parameter adjustment procedure.
Figure 8A:
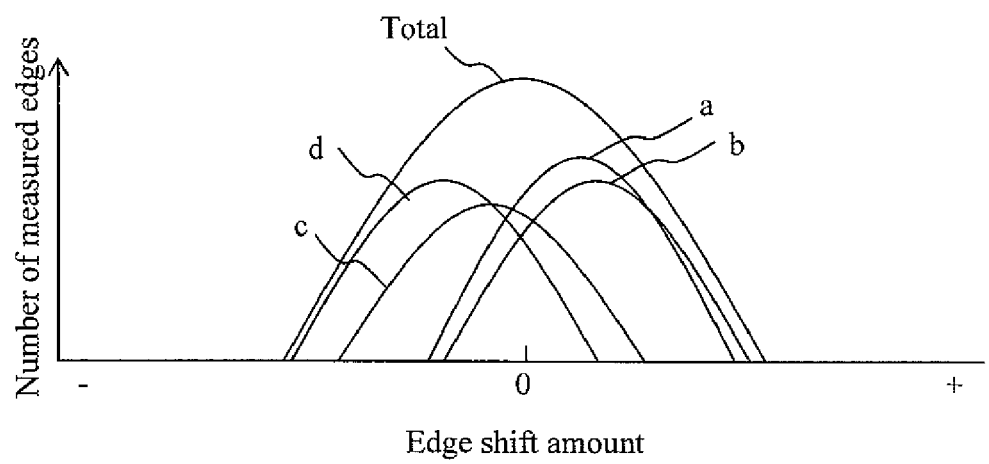
FIG. 8A is a graph showing the distributions of the edge shifts classified by the preceding mark lengths.
Figure 8B:
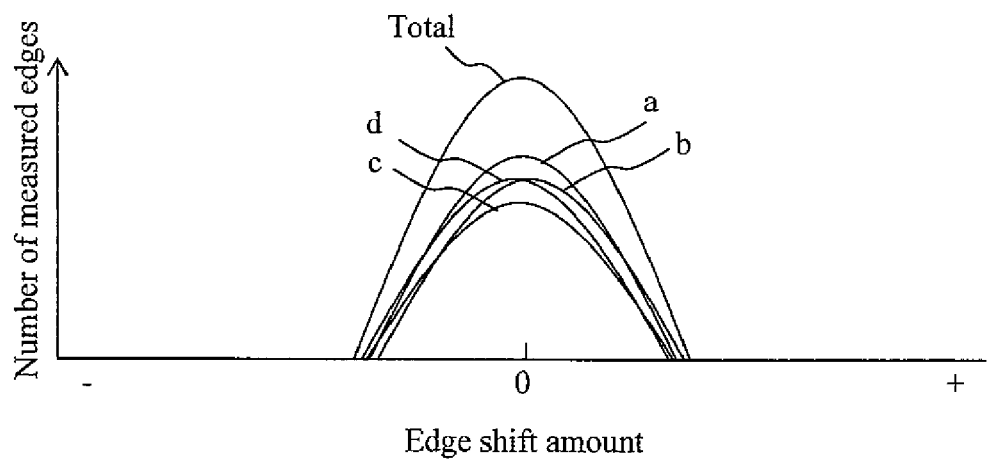

Next, description will be given of a configuration example of a laser-power/pulse controller 120. Here, the N−1 write strategy shown in FIG. 1 is used as a recording scheme. For each of output power levels $P_W$, $P_S$, $P_{BW}$ and $P_C$ for a laser beam, a value specified by data recorded in a control information memory area of the optical disc medium is used. If no values are specified for the power levels, the power levels are determined through test writing.

As to pulse parameters, setting values are determined for each of a first-pulse start-edge time TSFP and a first-pulse duration FP on the basis of the table shown in FIG. 4A, while setting values are determined for each of a last-pulse start-edge time TSLP, a last-pulse duration LP and a cooling pulse duration CP on the basis of the table shown in FIG. 4B. Specifically, as to each of TSFP and FP, values are set on the basis of combination patterns of mark lengths and preceding space lengths on the basis of the parameter table shown in FIG. 4A; as to each of TSLP, LP and CP, values are set on the basis of combination patterns of the mark lengths and succeeding space lengths on the basis of the parameter table shown in FIG. 4B. The same setting value is used for a multipulse duration MP in all the patterns without using classification by the mark lengths and adjacent space lengths.

Figure 12:
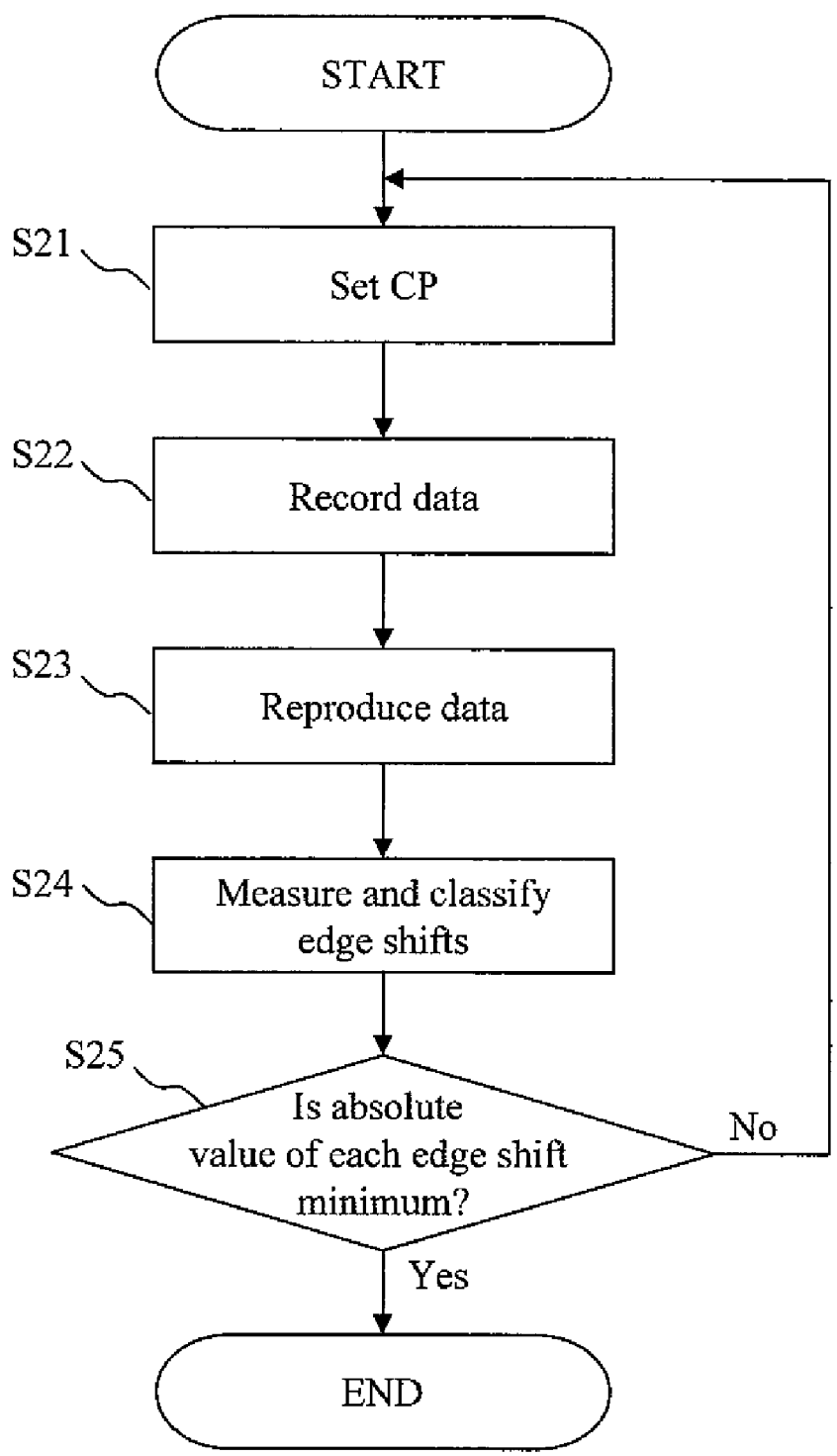
FIG. 12 is a flowchart showing an example of a cooling pulse duration adjustment procedure.

Next, description will be given of an embodiment of a cooling pulse duration adjustment method according to the present invention. FIG. 12 is a flowchart showing an example of a cooling pulse duration adjustment procedure. When processing is started, each of the setting values set for the cooling pulse duration according to the mark lengths is changed (Step 21). Random data is recorded under the conditions of a set power and pulse parameter (Step 22). Then, the reproduction signal processor 130 reproduces the recorded data and thereby generates a channel bit clock signal and a binarized reproduction signal (Step 23). Thereafter, by using the generated channel bit clock signal and binarized reproduction signal, the edge shift detector 135 measures edge shifts, and thereby calculates edge shift values on the basis of combination patterns of the recorded mark lengths and the preceding space lengths and also on the basis of patterns further classified by the preceding mark lengths (Step 24). Then, it is determined whether the absolute value of each of the edge shifts classified by the preceding mark lengths is the minimum (Step 25). If Yes, the processing is terminated; if No, the processing returns to Step 21 again and the setting values for the cooling pulse duration are changed.

Embodiment 2

Description will be given of another embodiment of the cooling pulse duration adjustment method with reference to FIGS. 13A to 13C and FIG. 14. The same drive configuration as that in Embodiment 1 is used in this embodiment.

Figure 13A:
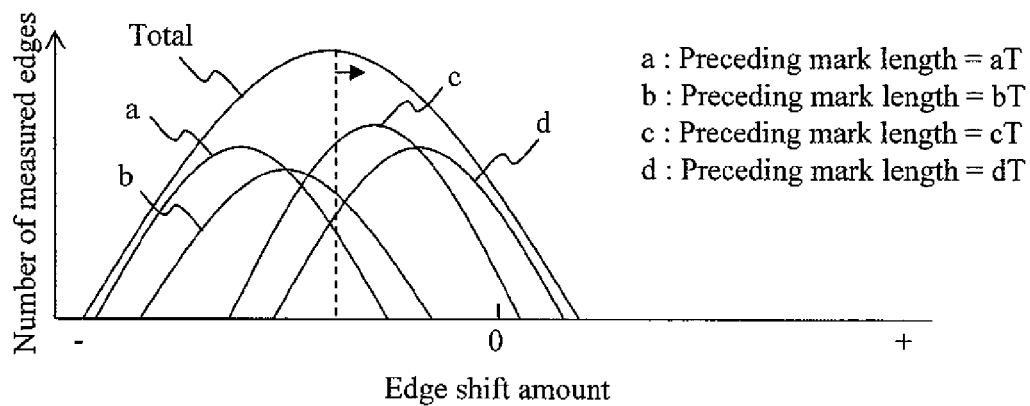
FIG. 13A is a graph showing distributions of edge shifts classified by preceding mark lengths.
Figure 13B:
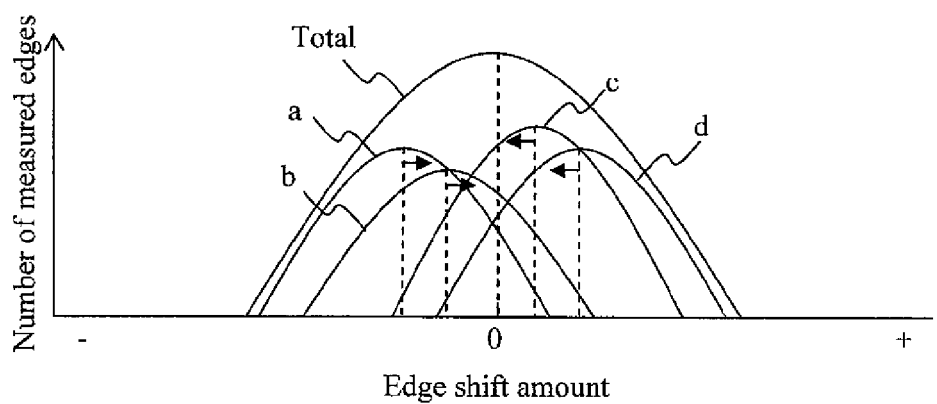
FIG. 13B is a graph showing distributions of the edge shifts classified by the preceding mark lengths.
Figure 13C:
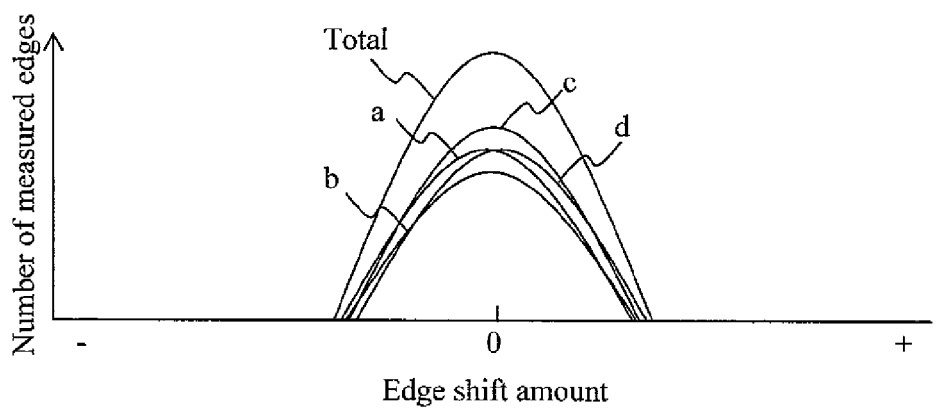
FIG. 13C is a graph showing distributions of the edge shifts classified by the preceding mark lengths.

In this embodiment, by a conventional method, each of first-pulse start-edge times classified on the basis of combinations of mark lengths and lengths of a space immediately preceding the mark is determined so that the absolute value of an edge shift amount of mark front edge of the corresponding combination of the mark length and the preceding space length would be approximately the minimum. Thereby, the total distribution average of the mark edge shifts is set to be 0. Subsequently, the cooling pulse duration for each of the mark lengths is adjusted so that the distribution average of the edge shifts classified by preceding mark lengths would be 0. FIGS. 13A to 13C are schematic graphs for explaining a processing procedure of this embodiment. FIG. 13A shows an initial state of each of distributions of front edge shifts further classified by preceding mark lengths for a certain pattern among the combination patterns of the mark lengths and the preceding mark lengths. Then, the first-pulse start-edge time corresponding to the pattern is adjusted so that the absolute value of the front edge shift amount corresponding to the pattern would be approximately the minimum. Thereby, the total distribution average of the mark edge shifts is set to be 0.

Subsequently, as shown by arrows in FIG. 13B, the cooling pulse duration is adjusted for each of the mark lengths so that each of the distribution averages of the edge shifts classified by the preceding mark lengths would be 0. Consequently, the state of each of the distributions is as shown in FIG. 13C.

Figure 14:
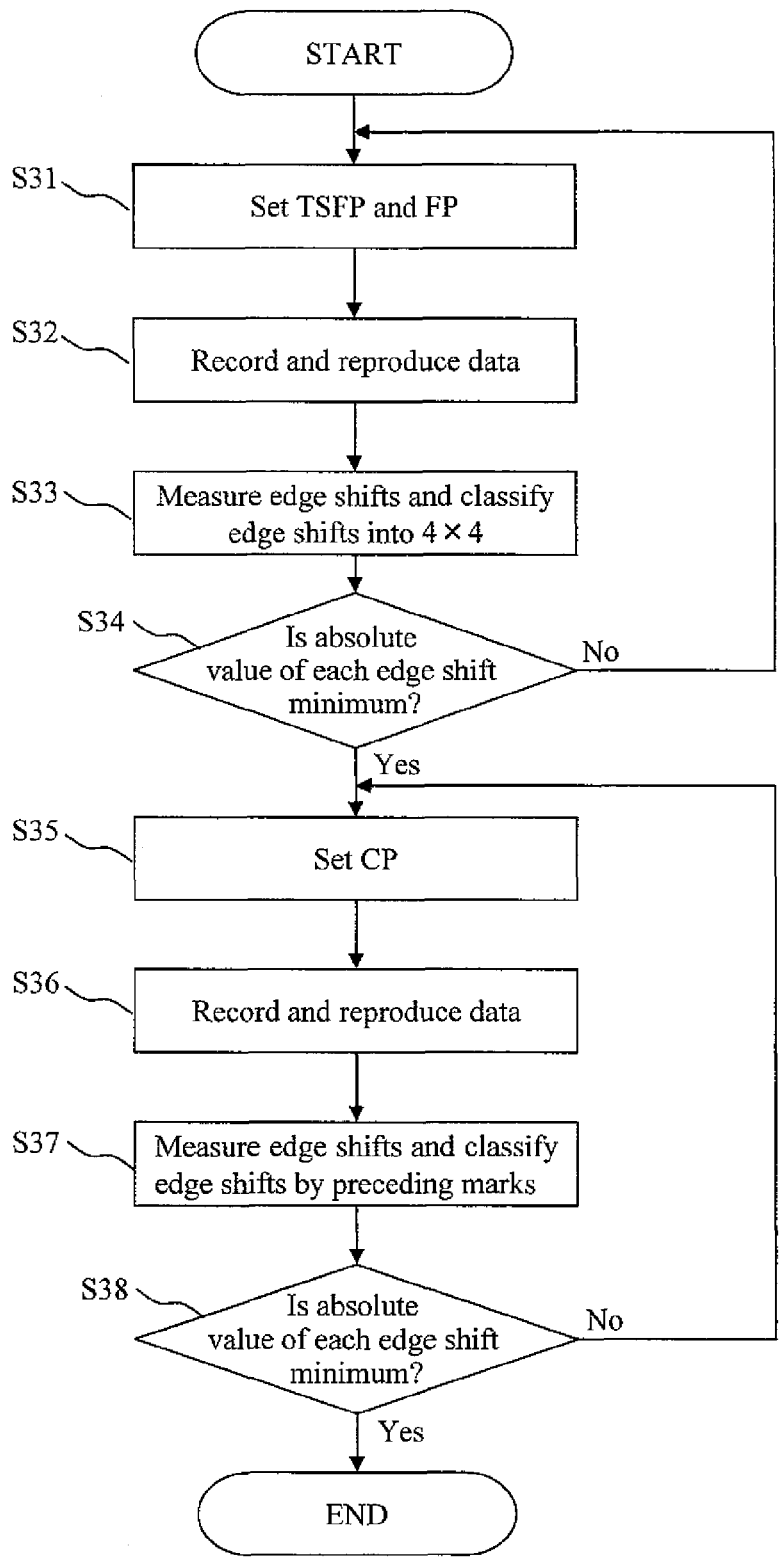
FIG. 14 is a flowchart showing an example of the cooling pulse duration adjustment procedure.

FIG. 14 is a flowchart showing the processing procedure of this embodiment. When processing is started, values for each of TSFP and FP are set in Step 31. Predetermined initial values are set in the first loop, while currently-set values are changed in the second or subsequent loop. Here, the values of each of TSFP and FP are classified and set on the basis of the combination patterns of the mark lengths and the preceding space lengths, in accordance with the table shown in FIG. 4A. In Step 32, random data is recorded on a predetermined portion of an optical disc medium, and the recorded data is reproduced. In Step 33, front edge shifts are classified and calculated on the basis of patterns of 4×4 combinations of the recorded mark lengths and the preceding space lengths, by using a reproduction signal. In Step 34, it is determined whether the absolute value of each of the edge shifts classified on the basis of all the patterns for front edge is the minimum. If Yes, the processing advances to Step 35; if No, the processing returns to Step 31 and the pulse meter values are changed. In this way, the pulse parameters are determined so that the absolute value of the edge shift of each of all the 4×4 patterns for front edge would be the minimum.

Then, in Step 35, values are set for a cooling pulse duration CP. Predetermined initial values are set in the first loop, while currently-set values are changed in the second or subsequent loop. Here, CP is classified and set on the basis of the mark lengths. In Step 36, random data is recorded on a predetermined portion of the optical disc medium, and the recorded data is reproduced. In Step 37, a front edge shift is classified and calculated on the basis of the preceding mark lengths. In Step 38, it is determined whether the absolute value of each of all the edge shifts classified by the preceding mark lengths is the minimum. If Yes, the processing is terminated; if No, the processing returns to Step 35 and the values for CP are changed.

Embodiment 3

Description will be given of another embodiment of the cooling pulse duration adjustment method with reference to FIGS. 15A to 15C and FIG. 16. The same drive configuration as that in Embodiment 1 is used in this embodiment.

Figure 15A:
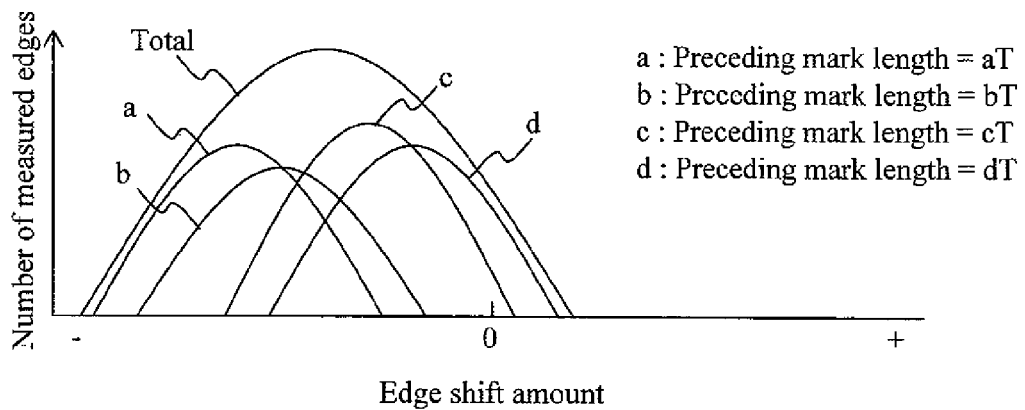
FIG. 15A is a graph showing distributions of edge shifts classified by preceding mark lengths.
Figure 15B:
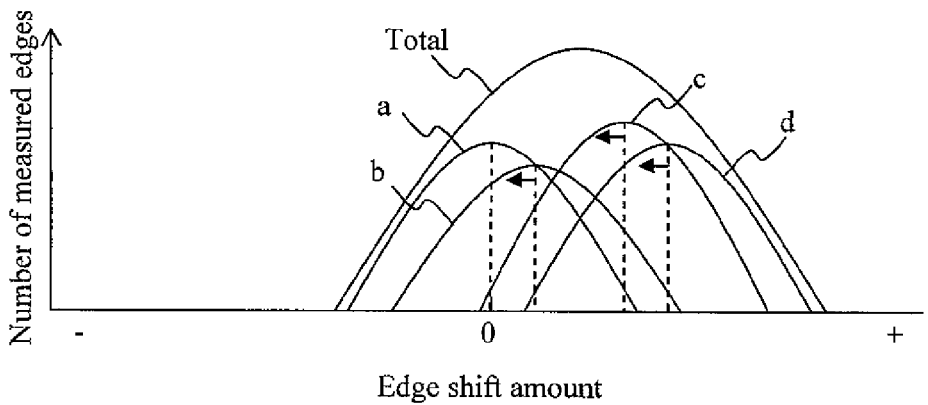
FIG. 15B is a graph showing distributions of the edge shifts classified by the preceding mark lengths.
Figure 15C:
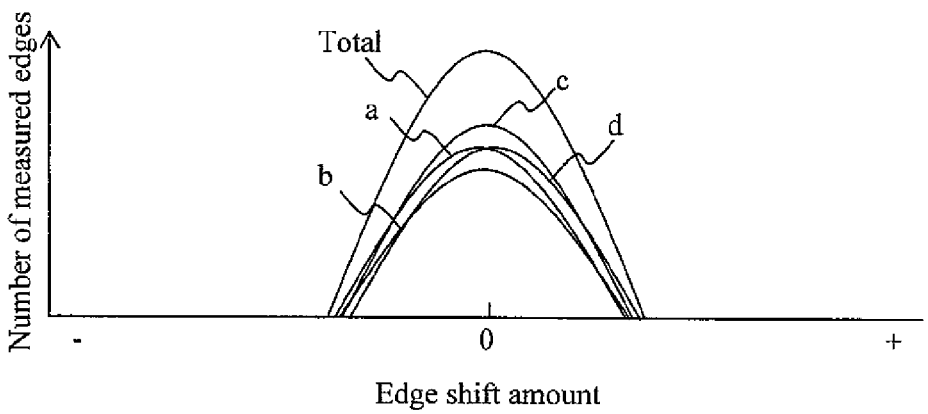
FIG. 15C is a graph showing distributions of the edge shifts classified by the preceding mark lengths.

In this embodiment, firstly, the average of a distribution of edge shifts which are the smallest is set to be 0 by general front edge compensation, and thereafter the average of each of the other distributions is set to be 0 by reducing a cooling pulse duration. FIGS. 15A to 15C are schematic graphs for explaining a processing procedure of this embodiment. FIG. 15A shows an initial state of each of distributions of edge shifts classified by preceding mark lengths. Then, the front edge compensation is performed on each mark in the same manner. Thereby, the average of the distribution of the edge shifts which are the smallest is set to be 0 as shown in FIG. 15B. In the case of the example shown in the drawings, the average of a distribution a of edge shifts of each recorded mark having a preceding mark length of aT is set to be 0. Subsequently, as shown by arrows in FIG. 15B, the cooling pulse duration is adjusted for each of the mark lengths so that the absolute vale of each of all the edge shifts classified by the preceding mark lengths would be the minimum. Consequently, the state of each of the distributions is as shown in FIG. 15C.

Figure 16:
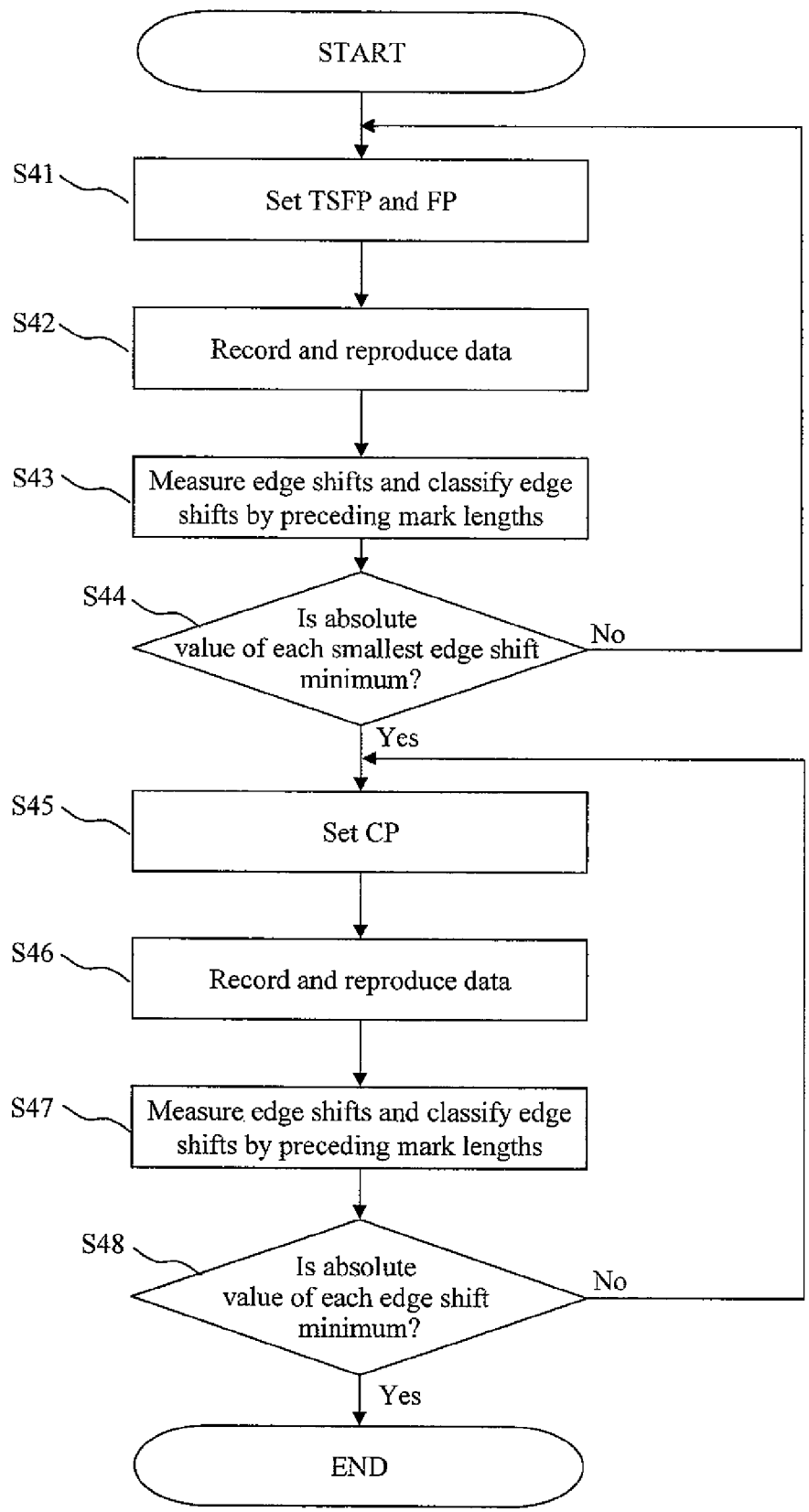
FIG. 16 is a flowchart showing an example of the cooling pulse duration adjustment procedure.

FIG. 16 is a flowchart showing the processing procedure of this embodiment. When processing is started, values for each of TSFP and FP are set in Step 41. Predetermined initial values are set in the first loop, while currently-set values are changed in the second or subsequent loop. Here, the values of each of TSFP and FP are classified and set on the basis of the combination patterns of the mark lengths and the preceding space lengths, in accordance with the table shown in FIG. 4A. In Step 42, random data is recorded on a predetermined portion of an optical disc medium, and the recorded data is reproduced. In Step 43, a front edge shift is calculated for each of the preceding mark lengths by using a reproduction signal. In Step 44, it is determined whether the absolute value of the smallest edge shift value among all the patterns for front edge is the minimum. If Yes, the processing advances to Step 45; if No, the processing returns to Step 41 and the pulse parameter values are changed. In this way, the pulse parameters are determined so that the absolute value of the edge shift of each of all the 4×4 patterns for front edge would be the minimum.

Then, in Step 45, values are set for a cooling pulse duration CP. Predetermined initial values are set in the first loop, while currently-set values are changed in the second or subsequent loop. Here, CP is classified and set on the basis of the mark lengths. In Step 46, random data is recorded on a predetermined portion of the optical disc medium, and the recorded data is reproduced. In Step 47, front edge shifts are classified and calculated on the basis of the preceding mark lengths. In Step 48, it is determined whether the absolute value of each of all the edge shifts classified by the preceding mark lengths is the minimum. If Yes, the processing is terminated; if No, the processing returns to Step 45 and the values for CP are changed.

Embodiment 4

Description will be given of another embodiment of the cooling pulse duration adjustment method with reference to FIGS. 17A to 17C and FIG. 18. The same drive configuration as that in Embodiment 1 is used in this embodiment.

Figure 17A:
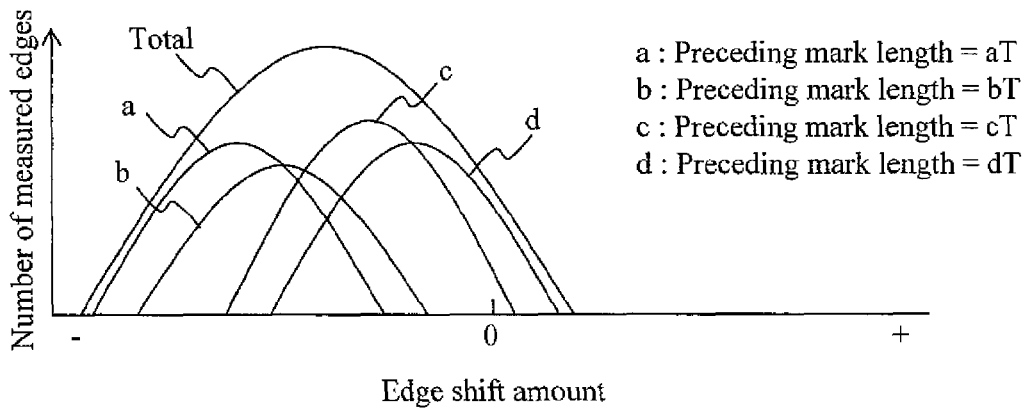
FIG. 17A is a graph showing distributions of edge shifts classified by preceding mark lengths.
Figure 17B:
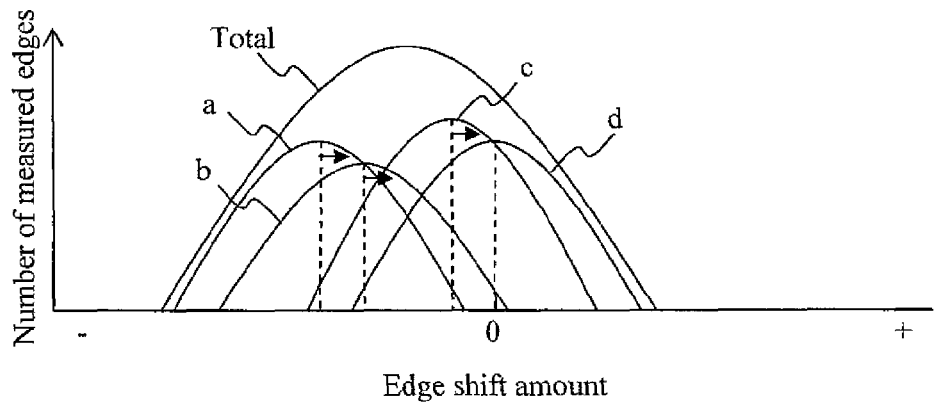
FIG. 17B is a graph showing distributions of the edge shifts classified by the preceding mark lengths.
Figure 17C:
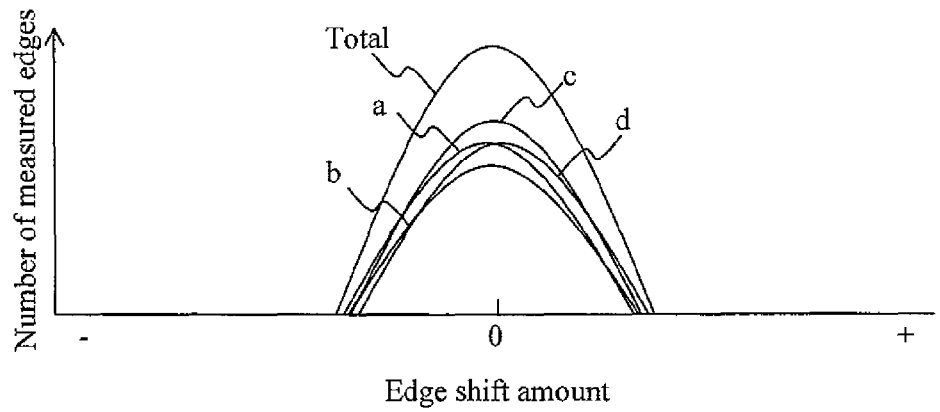
FIG. 17C is a graph showing distributions of the edge shifts classified by the preceding mark lengths.

In this embodiment, firstly, the average of a distribution of edge shifts which are the largest is set to be 0 by general front edge compensation, and thereafter the average of each of the other distributions is set to be 0 by increasing a cooling pulse duration. FIGS. 17A to 17C are schematic graphs for explaining a processing procedure of this embodiment. FIG. 17A shows an initial state of each of distributions of edge shifts classified by preceding mark lengths. Then, the front edge compensation is performed on the marks having each of all the mark lengths of the distributions in the same manner. Thereby, the average of the distribution of the edge shifts which are the largest is set to be 0 as shown in FIG. 17B. In the case of the example shown in the drawings, the average of a distribution d of edge shifts of each recorded mark having a preceding mark length of dT is set to be 0. Subsequently, as shown by arrows in FIG. 17B, the cooling pulse duration is adjusted for each of the mark lengths so that the absolute vale of each of all the edge shifts classified by the preceding mark lengths would be the minimum. Consequently, the state of each of the distributions is as shown in FIG. 17C.

FIG. 18 is a flowchart showing the processing procedure of this embodiment. When processing is started, values for each of TSFP and FP are set in Step 51. Predetermined initial values are set in the first loop, while currently-set values are changed in the second or subsequent loop. Here, the values of each of TSFP and FP are classified and set on the basis of the combination patterns of the mark lengths and the preceding space lengths, in accordance with the table shown in FIG. 4A. In Step 52, random data is recorded on a predetermined portion of an optical disc medium, and the recorded data is reproduced. In Step 53, a front edge shift is calculated for each of the preceding mark lengths by using a reproduction signal. In Step 54, it is determined whether the absolute value of the largest edge shift value among all the patterns for front edge is the minimum. If Yes, the processing advances to Step 55; if No, the processing returns to Step 51 and the pulse parameter values are changed. In this way, the pulse parameters are determined so that the absolute value of the edge shift of each of all the 4×4 patterns for front edge would be the minimum.

Then, in Step 55, values are set for a cooling pulse duration CP. Predetermined initial values are set in the first loop, while currently-set values are changed in the second or subsequent loop. Here, CP is classified and set on the basis of the mark lengths. In Step 56, random data is recorded on a predetermined portion of the optical disc medium, and the recorded data is reproduced. In Step 57, front edge shifts are classified and calculated on the basis of the preceding mark lengths. In Step 58, it is determined whether the absolute value of each of all the edge shifts classified by the preceding mark lengths is the minimum. If Yes, the processing is terminated; if No, the processing returns to Step 55 and the values for CP are changed.

Embodiment 5

Description will be given of another embodiment of the cooling pulse duration adjustment method, with reference to FIGS. 19A to 19C and FIG. 20. The same drive configuration as that in Embodiment 1 is used in this embodiment.

Figure 19A:
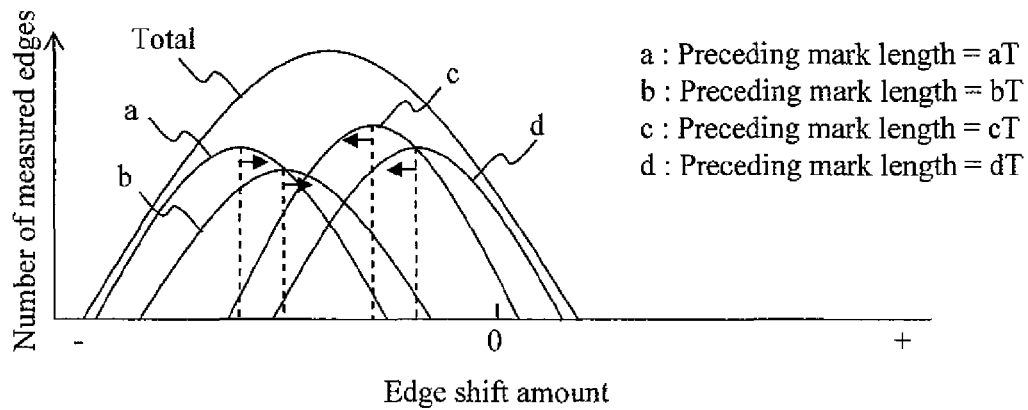
FIG. 19A is a graph showing distributions of edge shifts classified by preceding mark lengths.
Figure 19B:
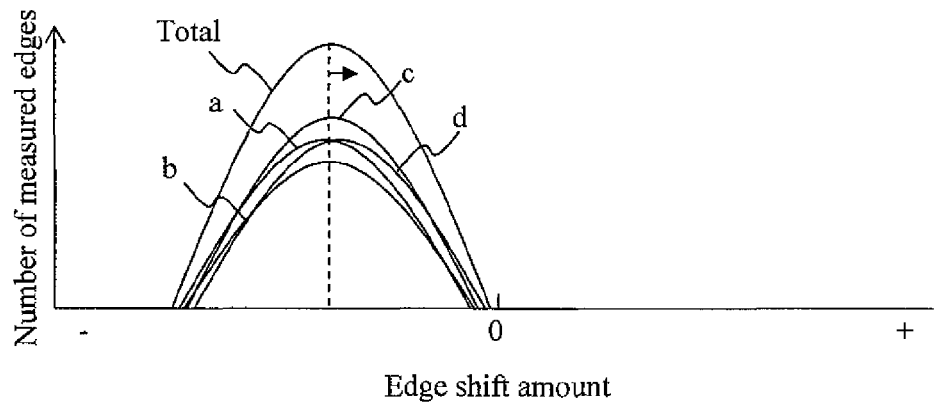
FIG. 19B is a graph showing distributions of the edge shifts classified by the preceding mark lengths.
Figure 19C:
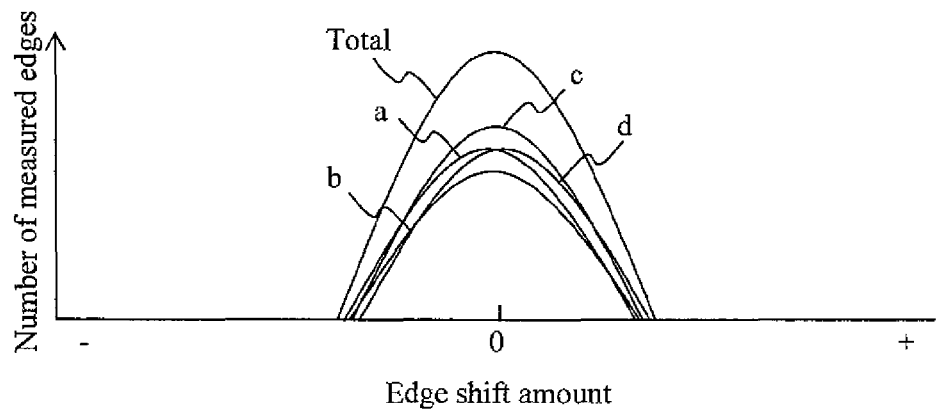
FIG. 19C is a graph showing distributions of the edge shifts classified by the preceding mark lengths.

In this embodiment, edge shifts depending on preceding mark lengths are compensated by cooling pulse adjustment, and general front edge compensation is then performed on the compensated edge shifts, thereby setting the averages of all the distributions of the edge shifts classified by the preceding mark lengths to be 0. FIGS. 19A to 19C are schematic graphs explaining a processing procedure of this embodiment. FIG. 19A shows an initial state of each of distributions of edge shifts classified by the preceding mark lengths. The adjustment for cooling pulse duration depending on mark lengths is performed on the distributions. Thereby, the ranges of the front edge shift values classified by the preceding mark lengths are set to be approximately the same as shown in FIG. 19B. Subsequently, as shown by arrows in FIG. 19B, the front edge compensation is performed on the marks of all the mark lengths in the same manner, and thereby the average of each of the distributions of the edge shifts classified by the preceding mark lengths is set to be 0. Consequently, the state of each of the distributions is as shown in FIG. 19C.

Figure 20:
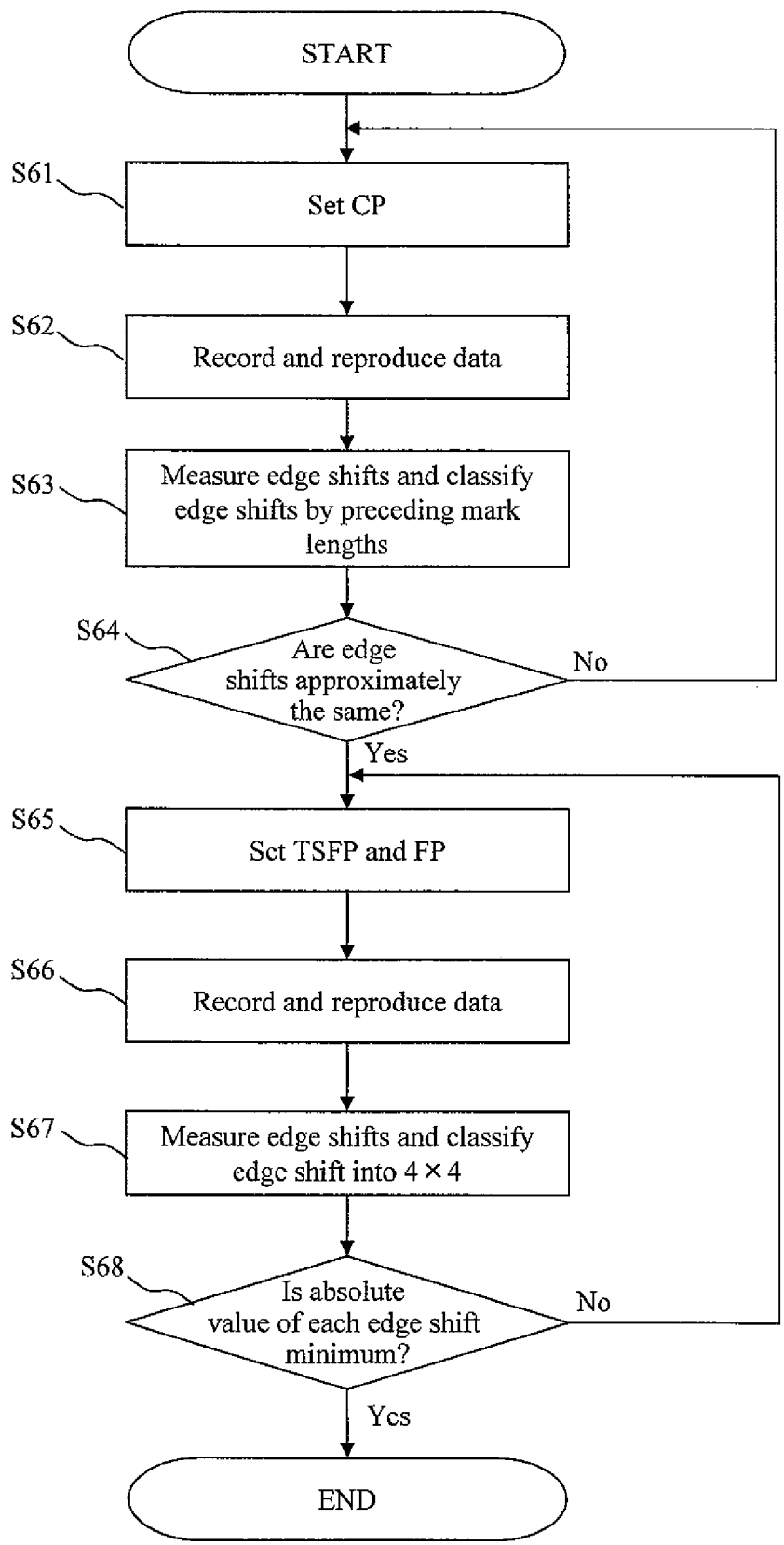
FIG. 20 is a flowchart showing an example of the cooling pulse duration adjustment procedure.

FIG. 20 is a flowchart showing the processing procedure of this embodiment. When processing is started, values are set for CP in Step 61. Predetermined initial values are set in the first loop, while currently-set values are changed in the second or subsequent loop. Here, CP is classified and set on the basis of the mark lengths. In Step 62, random data is recorded on a predetermined portion of an optical disc medium, and the recorded data is reproduced. In Step 63, front edge shifts are classified and calculated on the basis of preceding mark lengths, by using a reproduction signal. In Step 64, it is determined whether the front edge shift values of all the patterns are approximately the same. If Yes, the processing advances to Step 65; if No, the processing returns to Step 61, and the pulse parameter values are changed. In this way, values are determined for CP so that the front edge shift values classified by the preceding mark lengths would be approximately the same.

Then, in Step 65, values for each of TSFP and FP are set in Step 65. Predetermined initial values are set in the first loop, while currently-set values are changed in the second or subsequent loop. Here, the values of each of TSFP and FP are classified and set on the basis of combination patterns of the mark lengths and the preceding space lengths, in accordance with the table shown in FIG. 4A. In Step 66, random data is recorded on a predetermined portion of an optical disc medium, and the recorded data is reproduced. In Step 67, a front edge shift is classified and calculated on the basis of the combination patterns of the mark lengths and the preceding space lengths, by using a reproduction signal. In Step 68, it is determined whether each of all the edge shift values thus classified is the minimum. If Yes, the processing is terminated; if No, the processing returns to Step 65 and the values of each of TSFP and FP are changed.

The effects of the present invention are not limited to the above-described embodiments.

In the above-described embodiments, the "N−1 write strategy" is used as a recording scheme. However, the present invention can be similarly applied to a case of employing a recording method such as an "N/2 write strategy" or a "castle write strategy."

In the above-described embodiments, an edge shifts calculated on the basis of a time difference between a channel bit clock signal and a binarized reproduction signal is used. However, edge shifts are not limited to that, and may be one calculated on the basis of a Euclidean distance between a target signal and a reproduction signal in a reproduction system using PRML.

DESCRIPTION OF REFERENCE NUMERALS 100 optical disc medium
101 optical spot
110 optical head
111 objective lens
112 laser diode
113 optical detector
114 laser beam
115 reflected laser beam
116 laser driver
120 laser-power/pulse controller
130 reproduction signal processor
135 edge shift detector
140 CPU
160 spindle motor
200 system controller

What is claimed is:

1. An optical disc recording method in which information is recorded on an optical disc medium by irradiating the optical disc medium with a laser beam to form marks and portions between the marks (spaces), the laser beam being intensity-modulated to have pulse strings each including a cooling pulse, the optical disc recording method comprising the steps of:

detecting an edge shift amount, per a mark length of nT, of a front edge of each recorded mark whose preceding mark is a mark having a length of nT, wherein n is an integer and T is a channel bit length;

determining a duration of the cooling pulse in the pulse string forming the mark having a length of nT, on the basis of the detected edge shift amount and whether the detected edge shift amount is within an ignorable range;

recording information on the optical disk medium by use of the determined pulse strings.

2. The optical disc recording method according to claim 1, wherein the recorded mark is one whose immediately preceding space has a minimum length in accordance with a code rule.

3. The optical recording method according to claim 1, wherein the recorded mark is one having a length which is a minimum in accordance with a code rule.

4. The optical recording method according to claim 1, wherein the recorded mark is one having a length which is a minimum in accordance with a code rule and one whose immediately preceding space has a minimum length in accordance with the code rule.

5. The optical disc recording method according to claim 1, wherein the duration of the cooling pulse in the pulse string forming the mark having a length of nT is determined so that an absolute value of the edge shift amount is approximately a minimum.

6. The optical disc recording method according to claim 1, wherein the duration of the cooling pulse in the pulse string forming the mark having a length of nT is determined so that the edge shift amounts are approximately the same.

7. The optical disc recording method according to claim 1, wherein a duration of each pulse and any one of a start time and an end time of the pulse in each of the pulse strings are classified and controlled at least on the basis of the mark lengths.

8. The optical disc recording method according to claim 1, wherein a duration of each pulse and any one of a start time and an end time of the pulse in each of the pulse strings are classified and controlled at least on the basis of combinations of lengths of the marks and lengths of the spaces each immediately preceding a corresponding one of the marks.

9. The optical disc recording method according to claim 1, comprising the steps of:
determining a start time of each of the pulse strings classified on the basis of combinations of lengths of the marks and lengths of the spaces each immediately succeeding a corresponding one of the marks, so that an absolute value of the edge shift amount of the front edge of each of the marks classified on the basis of the combinations of the lengths of the marks and the lengths of the spaces each immediately preceding the corresponding mark is approximately a minimum; and
subsequently determining the duration of the cooling pulse in each of the pulse strings each forming a mark having a length of nT, so that an absolute value of the edge shift amount is approximately a minimum.

10. The optical disc recording method according to claim 1, comprising the steps of:
determining the duration of the cooling pulse in the pulse string forming the mark having a length of nT, so that an absolute value of the edge shift amount is approximately a minimum; and
subsequently determining a start time of each of the pulse strings classified by combinations of lengths of the marks and lengths of the spaces each immediately succeeding a corresponding one of the marks, so that an absolute value of the edge shift amount of the front edge of each of the marks classified on the basis of the combinations of the lengths of the marks and the lengths of the spaces each immediately preceding the corresponding mark is approximately a minimum.

11. The optical disc recording method according to claim 1, wherein the optical disc medium is a write-once read-many optical disc.

12. The optical disc recording method according to claim 1, comprising the steps of:
classifying and detecting edge shift amounts of the front edges of the marks on the basis of lengths of the marks each preceding a corresponding one of the marks;
determining a start time of each of the pulse strings classified by combinations of lengths of the marks and lengths of the spaces each immediately succeeding a corresponding one of the marks, so that an absolute value of a smallest one of the edge shift amounts thus classified and detected is a minimum; and
subsequently determining the duration of the cooling pulse in each of the pulse strings each forming a mark having a length of nT, so that an absolute value of the edge shift amount is approximately a minimum.

13. The optical disc recording method according to claim 1, comprising the steps of:
classifying and detecting edge shift amounts of the front edges of the marks on the basis of lengths of the marks each preceding a corresponding one of the marks;
determining a start time of each of the pulse strings classified by combinations of lengths of the marks and lengths of the spaces each immediately succeeding a corresponding one of the marks, so that an absolute value of a largest one of the edge shift amounts thus classified and detected is a minimum; and
subsequently determining the duration of the cooling pulse in each of the pulse strings each forming a mark having a length of nT, so that an absolute value of the edge shift amount is approximately a minimum.

14. An optical disc recorder comprising:
a laser beam generating means configured to record information on an optical disc medium by irradiating the optical disc medium with a laser beam to form marks and portions between the marks (spaces), the laser beam being intensity-modulated to have pulse strings each including a cooling pulse;
a laser beam controlling means configured to control a power level, a duration and any one of a start time and an end time of each pulse in the pulse strings; and
an edge shift detecting means configured to detect an edge shift amount of each of the marks thus formed, wherein
the edge shift detecting means configured to classify and calculate an edge shift amount, per a mark length of nT, of a front edge of each mark whose preceding mark is a mark having a length of nT, on the basis of lengths of the marks each preceding any one of the marks, where n is an integer and T is a channel bit length, and determine if the detected edge shift amount is within an ignorable range;
the laser beam controlling means is configured to determine a duration of the cooling pulse in the pulse string forming the mark having a length of nT, on the basis of the detected edge shift amount and whether the detected edge shift amount is within an ignorable range.

15. The optical disc recorder according to claim 14, wherein the laser beam controlling means is configured to determine a duration of the cooling pulse in the pulse string forming the mark having a length of nT, so that an absolute value of the edge shift amount is approximately a minimum.

16. The optical disc recording method according to claim 1, wherein the ignorable range comprises edge shift values within a range of ±3%.

17. The optical disc recorder according to claim 14, wherein the ignorable range comprises edge shift values within a range of ±3%.

18. The optical disc recording method according to claim 1, wherein said ignorable range means that said edge shift amount would be minimum.

19. The optical disc recording method according to claim 14, wherein said ignorable range means that said edge shift amount would be minimum.

20. The optical disc recording method according to claim 1, wherein said ignorable range corresponds to a range within which an absolute value of said edge shift amount is smaller than a predetermined minimum value.

21. The optical disc recording method according to claim 14, wherein said ignorable range corresponds to a range within which an absolute value of said edge shift amount is smaller than a predetermined minimum value.

* * * * *